United States Patent
Kusayanagi et al.

(10) Patent No.: US 7,424,005 B1
(45) Date of Patent: Sep. 9, 2008

(54) LAYER 2 LINK HANDLER AND PATH CONNECTION METHOD THEREOF

(75) Inventors: Michio Kusayanagi, Kawasaki (JP); Tomohiro Ishihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 427 days.

(21) Appl. No.: 09/651,988

(22) Filed: Aug. 30, 2000

(30) Foreign Application Priority Data

Sep. 3, 1999 (JP) .................................. 11-249627

(51) Int. Cl.
*H04L 12/66* (2006.01)
*H04L 12/28* (2006.01)
*H04L 12/56* (2006.01)

(52) U.S. Cl. ..................... 370/352; 370/395.1; 370/409

(58) Field of Classification Search .............. 370/395.1, 370/397, 409, 399, 352
See application file for complete search history.

(56) References Cited

U.S. PATENT DOCUMENTS

| | | | | |
|---|---|---|---|---|
| 6,016,319 A * | 1/2000 | Kshirsagar et al. | ........... | 370/410 |
| 6,091,734 A * | 7/2000 | Suzuki et al. | ................ | 370/410 |
| 6,519,256 B1 * | 2/2003 | Kim | ......................... | 370/395.1 |
| 6,587,457 B1 * | 7/2003 | Mikkonen | .................... | 370/356 |
| 6,618,377 B1 * | 9/2003 | Miriyala | .................. | 370/395.1 |
| 6,714,544 B1 * | 3/2004 | Bosloy et al. | ............. | 370/395.1 |
| 6,738,354 B1 * | 5/2004 | Ashwood Smith | ........... | 370/248 |
| 6,744,726 B1 * | 6/2004 | Minami | ....................... | 370/217 |
| 7,012,892 B1 * | 3/2006 | McAllister et al. | ........... | 370/231 |
| 2002/0057700 A1 * | 5/2002 | Sreedharan et al. | ..... | 370/395.63 |

FOREIGN PATENT DOCUMENTS

WO   WO 99/18761   4/1999

OTHER PUBLICATIONS

European Search Report dated Oct. 19, 2005.
G. Gross, et al. "PPP Over AAL5" IETF Standard, Internet Engineering Task Force, Jul. 1998, XP015008148.

* cited by examiner

*Primary Examiner*—Edan Orgad
*Assistant Examiner*—Blanche Wong
(74) *Attorney, Agent, or Firm*—Katten Muchin Rosenman LLP

(57) ABSTRACT

To make an efficient network operation possible in which a user-side device connected by a permanent virtual connection path is selectively connected to one among multiple specified connection destinations, and multiple layer 2 links are multiplexed to one path, a layer 2 link handler is connected to the user-side device by a permanent virtual connection path PVC via the ATM switch the layer 2 link handler has a path specifying units and is connected to multiple specified connection destinations by permanent virtual connection paths or switched virtual connection path via ATM switch that specifies one path of the connection request destinations from layer 2 link information emitted from the user-side device at the time of the layer 2 link connection request, and sets to the path of that specified connection destination a layer 2 link of the permanent virtual connection path PVC of the user-side device. Labels are assigned to layer 2 links, and layer 2 links may be multiplexed.

11 Claims, 27 Drawing Sheets

| NSP NAME | ATM ADDRESS |
|---|---|
| NSP-A | 011014157798702 |
| NSP-B | 011014157798467 |
| NSP-C | 011014157797356 |
| NSP-D | 011014157790533 |
| NSP-E | 011014157797824 |
| : | : |
| NSP-Z | 011014157798926 |

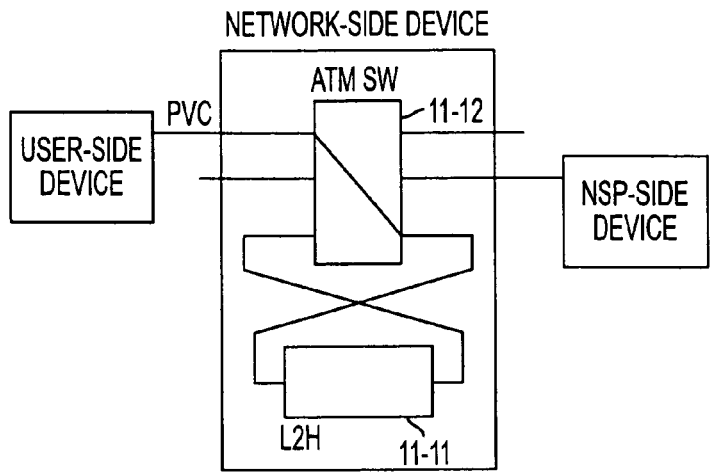
FIG. 11A
EXAMPLE OF TABLE HELD IN L2H
| NSP NAME | ATM ADDRESS |
|---|---|
| NSP-A | 011014157798702 |
| NSP-B | 011014157798467 |
| NSP-C | 011014157797356 |
| NSP-D | 011014157790533 |
| NSP-E | 011014157797824 |
| ⋮ | ⋮ |
| NSP-Z | 011014157798926 |
FIG. 11B
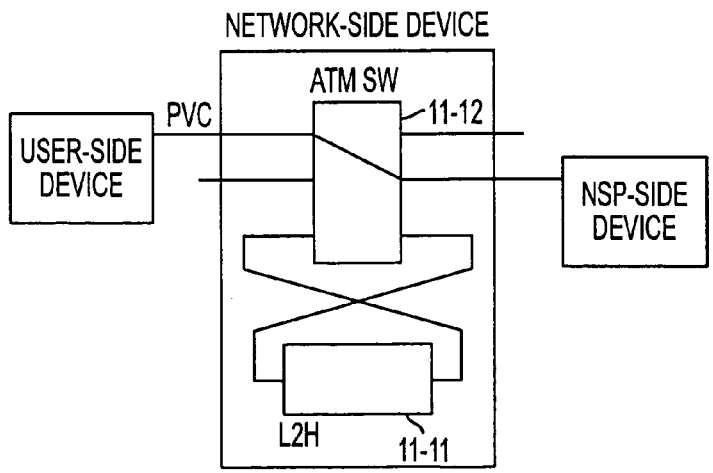
FIG. 11C

LAYER 2 LINK HANDLER AND PATH CONNECTION METHOD THEREOF

BACKGROUND OF THE INVENTION

1. Field of Invention

The present invention relates to a layer 2 link handler and layer 2 link path connection method. At present there is a growing demand for TCP/IP communication represented by LAN or Internet, etc., and it is desired that its communication speed be speeded up.

As one means for speeding up TCP/IP communication, systems are being adopted that employ an ATM (asynchronous transfer mode) network or other wide-area network as the low-level physical layer of the IP communication. This invention concerns a handler and layer 2 link path connection method that handle layer 2 link paths between such layer 3 IP communication and the ATM or other wide-area network of the low-level physical layer.

2. Description of the Prior Art

There are two types of path connections in an ATM network: an SVC (switched virtual connection) path, in which the user connects the path by specifying the other party every time communication is begun, and a PVC (permanent virtual connection) path, in which the path to the other party of the connection is set in advance.

An SVC (switched virtual connection) path is like a path connected in the present telephone network, according to the telephone number of the other party that is specified by the user. The ATM path is set according to the user side's specification of the other party's address on the ATM network, and it is set between the user side and the ATM exchange by exchanging, by a protocol known as I.2931, control signals (signaling) for ATM path setting, including a path connection request.

A PVC (permanent virtual connection) path is a path that is continuously set by a fixed path with the other party. Signaling is not needed to set a path between the user side and the ATM exchange; the path is set in advance by the operator on the ATM network side.

There are still few devices that support connections using an SVC (switched virtual connection) path for the connection between the user-side device and the ATM network-side device. At present, there are many that use a PVC (permanent virtual connection) path for the connection between the user-side device and the ATM network-side device. Because there is expected to be a growing demand for ordinary connection communication service, it is anticipated that connection by a PVC (permanent virtual connection) path will continue in the future as the main mode of connection.

FIG. 26 shows an example of connections using PVC (permanent virtual connection) paths between the user-side device and the device of network service provider (NSP) side. In this mode of connection, the connection destination of each user-side device is fixed, and one cannot select and connect to an arbitrary network service provider (NSP).

Many PVC (permanent virtual connection) paths are concentrated in the connection opening of each network service provider (NSP), and each network service provider (NSP) must handle many PVC (permanent virtual connection) paths. Because each PVC (permanent virtual connection) path must be assigned a fixed band at all times despite the concentration of many PVC (permanent virtual connection) paths, it is difficult to do traffic line collection.

FIG. 27 shows the frame composition if IP (Internet protocol) frame data is transmitted along ATM paths such as the aforesaid PVC (permanent virtual connection) paths. As shown in this diagram, a layer 3 IP frame is encapsulated in a layer 2 PPP (point-to-point protocol) and is broken up by AAL5 (ATM adaptation layer type 5) into ATM cells of the physical layer.

A connection by PPP protocol is an example of a connection-oriented layer 2 link, and a 1-to-1 link is set from the user-side device to the device on the network service provider (NSP) side. Only one PPP link can be set on a single PVC (permanent virtual connection) path on the ATM network.

If data communication service, etc. by IP frames is to be supplied by connection by such a PVC (permanent virtual connection) path between the user side and the network service provider (NSP) side, the following will be required of the equipment on the ATM network side.

If there is just one network service provider (NSP) to which a connection request is made by one user-side device, then it suffices to set one PVC (permanent virtual connection) path between each user-side device and device on the network service provider (NSP) side.

If each user wishes to make connections to multiple network service providers (NSPs), then there will be cases in which the user contracts simultaneously with multiple network service providers (NSPs) and chooses which network service provider (NSP) to connect to depending on the content of the communication or whether it is for private or commercial use.

Also, depending on the country, it is required that carriers offer users fair access open points to network service providers (NSPs), such as prohibiting network service provision by carriers or imposing the obligation that each carrier fairly provide access to the network service provider (NSP) the user wants.

For the above reasons, it is necessary that the ATM-side equipment be able to fairly access any network service provider (NSP) as demanded by the user, and it is required that a switching connection be made to any network service provider (NSP) the user wants, even if the user and the network service provider (NSP) are connected by a PVC (permanent virtual connection) path.

When a PVC (permanent virtual connection) path is individually set to a network service provider (NSP) from each user, the number of PVC (permanent virtual connection) paths connected to a network service provider (NSP) becomes enormous, so the equipment on the side of each network service provider (NSP) must be able to handle an enormous number of PVC (permanent virtual connection) paths.

Traffic line collection is difficult to do because, despite the concentration of traffic in the equipment on the side of a network service provider (NSP), a single PVC (permanent virtual connection) path has a 1-to-1 correspondence with the PPP link, and the channel identifiers on the ATM layer are different for each PVC (permanent virtual connection) path.

SUMMARY OF THE INVENTION

It is an object of the present invention to make it possible for a user-side device connected by a permanent virtual connection path to select and connect one among multiple specified connection destinations. The present invention provides a layer 2 link handler and a path connection method thereof such that it is possible to do traffic line collection by setting multiple layer 2 links on a single physical layer circuit, make network operation efficient, and execute high-speed switching in which multiple layer 2 links are logically separated.

Also, due to the present invention, high-speed switching by hardware becomes possible by doing switching by the assigned labels of layer 2 packets, without referencing the IP address within the layer 3 IP header, etc.

In this invention, a layer 2 link handler which is provided in a network-side device, is connected with the user-side device by a permanent virtual connection path, and where said user-side device is made to connect to one among multiple specified connection destinations via a permanent virtual connection path or a switched virtual connection path, the handler comprises a path specification means that specifies one path of the connection request destination from the layer 2 link information that is emitted from the user-side device at the time of a layer 2 link connection request, and a path connection means that causes said permanent virtual connection path connected with the user-side device to connect to one path of the connection request destination and form a path between the user-side device and the specified connection destination.

The path connection means has a distribution means that, by switching on the layer 2 packet level, distributes and transfers packets that arrive from the permanent virtual connection path connected with the user-side device to one path of the connection request destination.

The path connection means may have a setting means that newly sets one path of the connection request destination specified by the path specification means and connects a path between the user-side device and the specified connection destination.

The path connection means may have a labeling means which, based on layer 2 link information emitted from the user-side device at the time of a layer 2 link connection request, assigns a label of each layer 2 link of said connection request to a layer 2 packet from the user-side device, and said path connection means has a means that transfers, by label multiplex layer 2 links, the layer 2 packet labeled by the labeling means to the path to said specified connection destination.

The path connection means recognizes the labels of layer 2 packets that arrive from the permanent virtual connection path with the user-side device and to which labels are assigned for each layer 2 link, and transfers the layer 2 packets to the path to the specified connection destination that corresponds to a given label, and recognizes the labels of labeled layer 2 packets that arrive from the path with the specified connection destination and transfers the layer 2 packets to the permanent virtual connection path to the user-side device that corresponds to a given label.

The labeling means may have a selection means that, when a label is newly assigned to a layer 2 link, selects an arbitrary available label number and emits a labeled layer 2 packet, and said path connection means handles the link of the labeled layer 2 packet that is assigned the same label number and is sent back from the side of the device that received said labeled layer 2 packet, as a link of the pair of the layer 2 link newly assigned a label.

The labeling means may have an assigning means that newly selects a label number and assigns it including in the label a marking indicating that it is a transmission from the allocated label number management side, and handles the link of the labeled layer 2 packet sent back from the reception side with the same label number, to which is added a marking indicating a transmission from the label number non-management side, as a link of the pair of the layer 2 link newly assigned a label.

The labeling means, when it newly assigns a label to a layer 2 link, determines the label number by doing a negotiation mutually with the other device side.

The labeling means, when it newly assigns a label to a layer 2 link, assigns a label with a label number directed by operation of a network management operation device.

The path connection means recognizes the labels of layer 2 packets that arrive from the permanent virtual connection path with the user-side device and to which are assigned labels according to the quality-of-service class of each layer 2 link, and transfers layer 2 packets to the path to the specified connection destination that corresponds to the given label.

The path connection means may recognize the labels of layer 2 packets that arrive from the permanent virtual connection path with the user-side device and to which are assigned labels according to the connection destination of each layer 2 link, and transfer layer 2 packets to the path to the specified connection destination that corresponds to the given label.

The path connection means may recognize the labels of layer 2 packets assigned according to the distribution type of service in the IP packet within layer 2 link packets that arrive from the permanent virtual connection path with the user-side device, and transfer layer 2 packets to the path to the specified connection destination that corresponds to the given label.

The path connection means may have an extracting means that extracts the request connection destination name from layer 2 link information emitted from the user-side device at the time of a layer 2 link connection request and a conversion table that converts from said connection destination name to a connection address, and said path connection means has a means that uses the connection address obtained from said conversion table to cause a path to be connected between the user-side device and the specified connection destination.

The processing that specifies one path of the connection request destination from layer 2 link information in the path specification means is done under software control by a processor, and the path connection means that connects the permanent virtual connection path of the user-side device to the connection destination after one connection destination path is specified, is constituted by a switching means by hardware.

The above configuration can be combined appropriately, and is also applied to a layer 2 link handler provided in a user-side network terminating device or a network-side subscriber line concentrator device.

Also, in the layer 2 link path connection method of the present invention, it provides a layer 2 link handler connected by a permanent virtual connection path with the user-side device, the handler extracting the request connection destination name from layer 2 link information emitted from the user-side device at the time of a layer 2 link connection request, extracting the connection address from the connection destination name by a conversion table, and notifying the user-side device connected by a permanent virtual connection path of said connection address, the user-side device emitting the connection destination address it has been notified of to the network-side device, and based on the connection destination address, the network-side device connecting the user-side device and the connection destination by switching of permanent virtual connection paths or switched virtual connection paths.

BRIEF DESCRIPTION OF THE DRAWINGS

FIGS. 11 (a, b and c) diagrammatically explain the second mode of implementation of the invention and show a conversion table to ATM addresses;

DETAILED DESCRIPTION OF THE PREFERRED EMBODIMENTS

Figure 1:
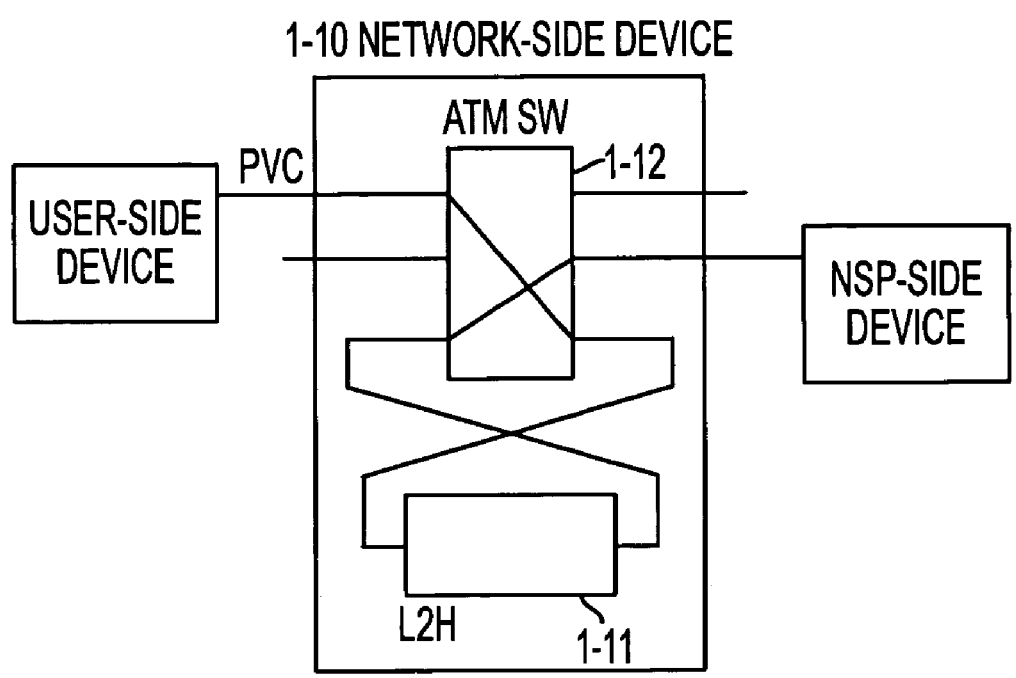
FIG. 1 is an explanatory diagram of the layer 2 handler of the present invention.

FIG. 1 is an explanatory diagram of the layer 2 handler of the present invention. Layer 2 handler 1-11 is provided within network-side device (for example, subscriber line concentrator device) 1-10, and by means of the layer 2 handler 1-11, the user-side device connected by a PVC (permanent virtual connection) path is selectively connected to one path of multiple specified connection destinations, such as network service providers (NSPs).

The user-side device is connected to network-side device 1-10 by a PVC (permanent virtual connection) path, and said PVC (permanent virtual connection) path is connected to layer 2 handler 1-11 via ATM switch 1-12, etc.

Layer 2 handler 1-11 identifies one path of specified connection destinations based on information for establishing a layer 2 link emitted by the user-side device at the time of initiation of the layer 2 link (PPP, etc.) connection of the user-side device, and a layer 2 packet (PPP packet, etc.) sent from the user-side device to the identified path of the specified connection destination is emitted via ATM switch 1-12, etc.

By using as an example a layer 2 link on a PVC (permanent virtual connection) path of the ATM network will be explained. However the layer 1 physical layer is not limited to an ATM network; it may also be a network such as SONET, Ethernet, or frame relay. The same is true also for all the following modes of implementation. In the following, specific implementations of a layer 2 handler to be selectively connected to a specified connection destination will be described.

Figure 2:
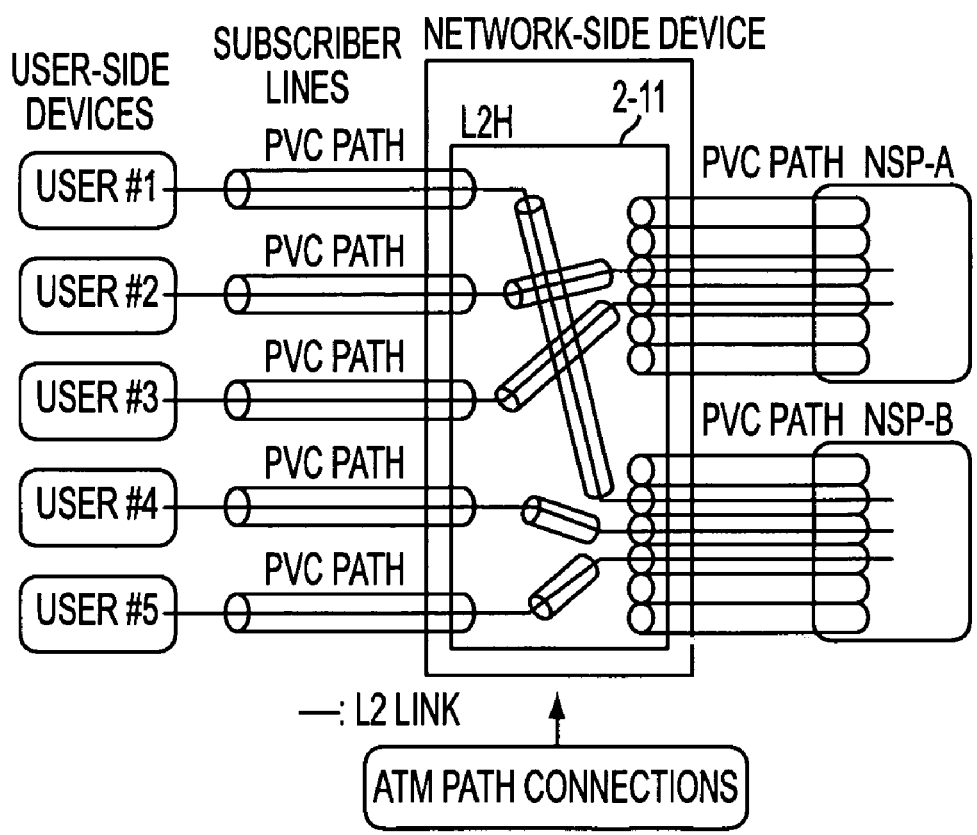
FIG. 2 is an explanatory diagram of a mode of implementation of the present invention for PVC (permanent virtual connection) path setting by ATM switching.

FIG. 2 is an explanatory diagram of a mode of implementation of the present invention for PVC (permanent virtual connection) path setting by ATM switching. If between each user-side device #1 to #5 and layer 2 handler 2-11 the connection is made by a PVC (permanent virtual connection) path, and between layer 2 handler 2-11 and the device on the network service provider (NSP-A, NSP-B) side the connection is made by a PVC (permanent virtual connection) path, then layer 2 handler 2-11 connects, by switching at the ATM level (in ATM cell units) the PVC (permanent virtual connection) path from each user-side device #1 to #5 to one specified connection destination path of a device, etc. on the network service provider (NSP-A, NSP-B) side.

Figure 3:
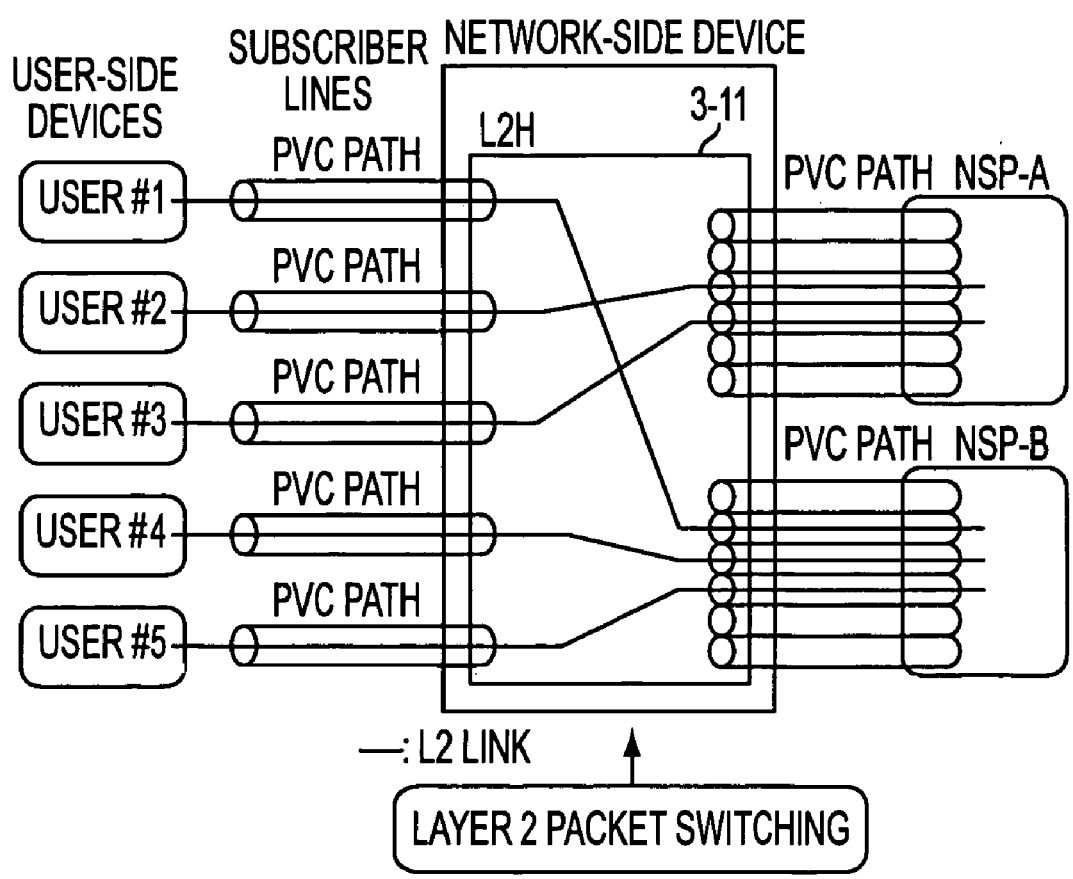
FIG. 3 is an explanatory diagram of a mode of implementation of the invention for PVC (permanent virtual connection) path setting by layer 2 switching.

FIG. 3 is an explanatory diagram of a mode of implementation of the invention for PVC (permanent virtual connection) path setting by layer 2 switching. As in the above implementation, if between layer 2 handler 3-11 and the device on the network service provider (NSP-A, NSP-B) side the connection is made by a PVC (permanent virtual connection) path, then layer 2 handler 3-11 connects, by switching at the layer 2 packet level (in packet units such as PPP packets) the PVC (permanent virtual connection) path from each user-side device #1 to #5 to one specified connection destination path of a device, etc. on the network service provider (NSP-A, NSP-B) side.

Figure 4:
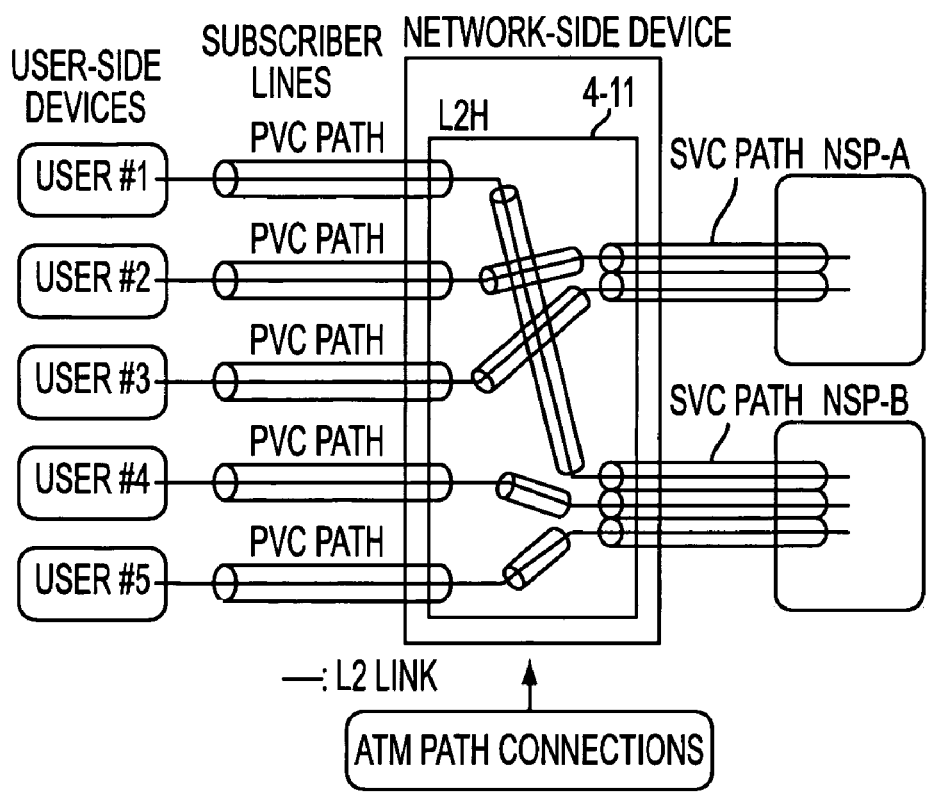
FIG. 4 is an explanatory diagram of a mode of implementation of the invention for SVC (switched virtual connection) path setting by ATM switching.

FIG. 4 is an explanatory diagram of a mode of implementation of the invention for SVC (switched virtual connection) path setting by ATM switching. If between each user-side device #1 to #5 and layer 2 handler 4-11 the connection is made by a PVC (permanent virtual connection) path, and between layer 2 handler 4-11 and the device on the network service provider (NSP-A, NSP-B) side the connection is made by an SVC (switched virtual connection) path, then layer 2 handler 4-11 specifies one connection destination, such as a network service provider (NSP), from information, etc. for establishing a layer 2 link emitted by the user-side device at the time of initiation of the layer 2 link connection of the user-side device.

Layer 2 handler 4-11 newly establishes an SVC (switched virtual connection) path to said specified connection destination by a signaling protocol. Layer 2 handler 4-11 sets connects, by switching at the ATM level (in ATM cell units) the PVC (permanent virtual connection) path with the user-side device to an SVC (switched virtual connection) path of one specified connection destination, such as a network service provider (NSP).

Figure 5:
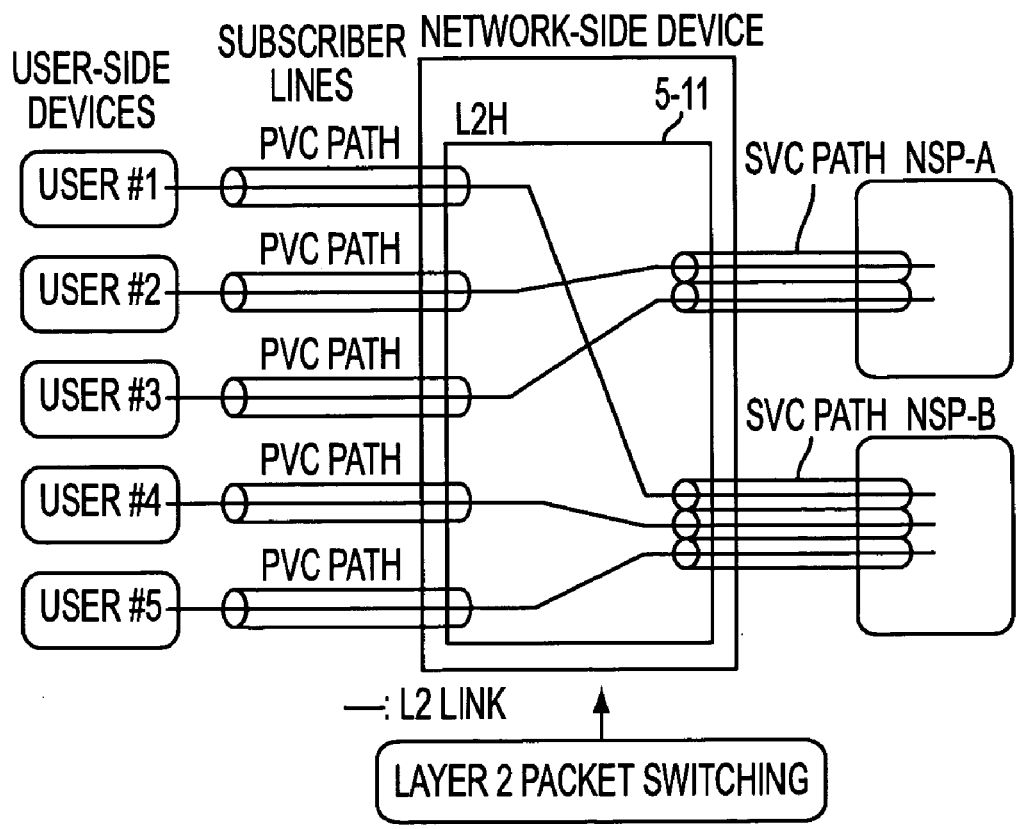
FIG. 5 is an explanatory diagram of a mode of implementation of the invention for SVC (switched virtual connection) path setting by layer 2 switching.

FIG. 5 is an explanatory diagram of a mode of implementation of the invention for SVC (switched virtual connection) path setting by layer 2 switching. As in the implementation shown in FIG. 4, layer 2 handler 5-11 specifies one connection destination, such as a network service provider (NSP), from information, etc. for establishing a layer 2 link emitted by the user-side device at the time of the beginning of the layer 2 link connection of the user-side device.

Layer 2 handler 5-11 newly establishes an SVC (switched virtual connection) path to said specified connection destination by a signaling protocol. Layer 2 handler 5-11 makes a layer 2 connection between the user-side device and one specified connection destination by switching, at the layer 2 packet level, (PPP packet, etc.) that arrives from the PVC (permanent virtual connection) path with the user-side device to an SVC (switched virtual connection) path of one specified connection destination, such as a network service provider (NSP).

Figure 6:
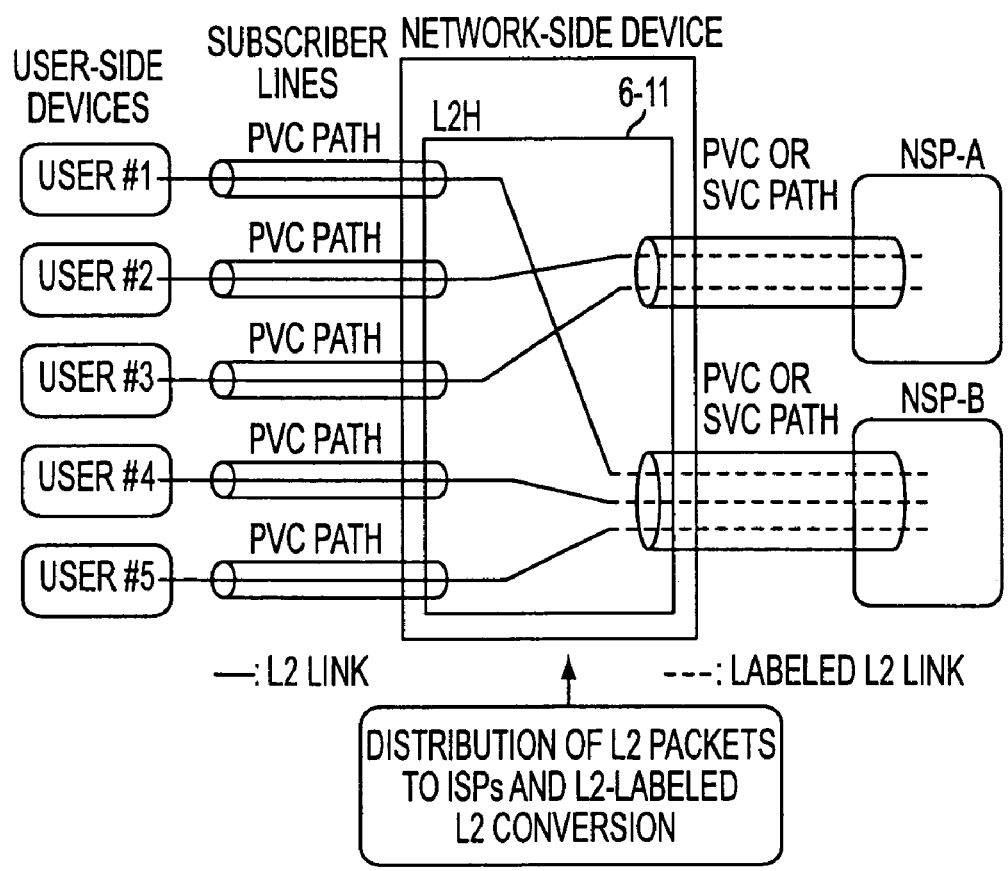
FIG. 6 is a diagram that shows the first mode of implementation of the invention for layer 2 switching by labeling.

FIG. 6 is a diagram showing the first mode of implementation of the invention for layer 2 switching by labeling. If between each user-side device #1 to #5 and layer 2 handler 6-11 the connection is made by a PVC (permanent virtual connection) path, and between layer 2 handler 6-11 and the device on the network service provider (NSP-A, NSP-B) side the connection is made by a PVC (permanent virtual connection) path or SVC (switched virtual connection) path, then layer 2 handler 6-11 specifies one connection destination from information, etc. for establishing a layer 2 link emitted by the user-side device at the time of the beginning of the layer 2 link connection of the user-side device.

Within layer 2 handler 6-11, a label to identify each individual layer 2 link is assigned to each layer 2 packet (PPP packet, etc.) that arrives from a PVC (permanent virtual connection) path with the user-side device, the labeled layer 2 packets are switched at the layer 2 packet level, and a layer 2 connection is made between the user-side device and the specified connection destination by multiplexing multiple layer 2 links into a single path of said specified connection destination.

Normally, a PPP packet, etc., which is a layer 2 packet, can set only one link on one physical layer circuit, but by making a conversion to labeled layer 2 packets it becomes possible to set multiple layer 2 links on one physical layer circuit.

And by multiplexing and setting multiple layer 2 links on one physical layer circuit, such as an ATM path, the traffic multiplexing effect comes into play, one physical layer circuit such as an ATM network circuit (VC) is effectively used, and the number of them can be reduced.

Figure 7:
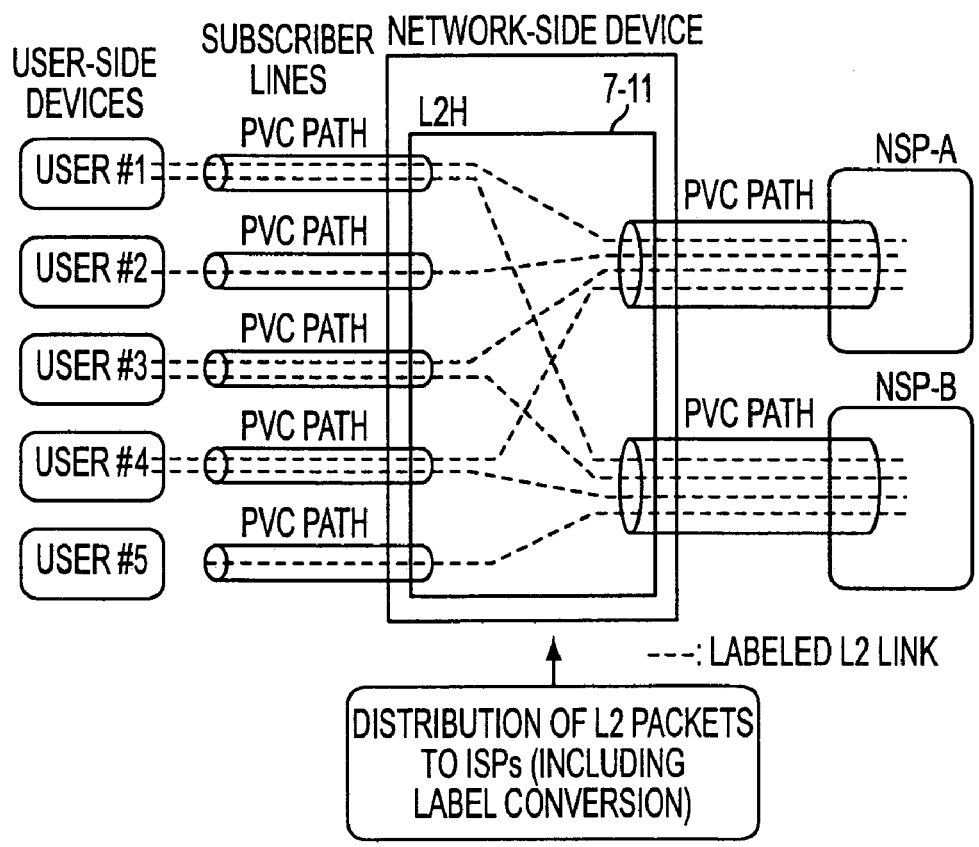
FIG. 7 is a diagram that shows the second mode of implementation of the invention for layer 2 switching by labeling.

FIG. 7 is a diagram showing the second mode of implementation of the invention for layer 2 switching by labeling. Between each user-side device #1 to #5 and layer 2 handler 7-11 the connection is made by a PVC (permanent virtual connection) path, and between layer 2 handler 7-11 and the device on the network service provider (NSP-A, NSP-B) side the connection is made by a PVC (permanent virtual connection) path or SVC (switched virtual connection) path.

Each user-side device #1 to #5 emits to a single PVC (permanent virtual connection) path a labeled layer 2 packet assigned a label to distinguish individual layer 2 links. That is, layer 2 links that are assigned different labels are multiplexed and set on a single PVC (permanent virtual connection) path between the user-side device and layer 2 handler 7-11.

When the layer 2 link connection of the user-side device begins, layer 2 handler 7-11 sets a single connection destination from information, etc. emitted by the user-side device for establishing a layer 2 link.

Layer 2 handler 7-11 performs a label conversion on the labeled layer 2 packets (PPP packets, etc.) that arrive from the PVC (permanent virtual connection) path with the user-side device, performs switching on the layer 2 packet level to one of the paths of the specified connection destinations to which the labeled layer 2 packet corresponds to said label, and, as in the above mode of implementation shown in FIG. 6, connects the user-side device and said connection destination by a multiplexed layer 2 link path between layer 2 handler 7-11 and the specified connection destination.

By multiplexing multiple layer 2 links on one PVC (permanent virtual connection) path with the user-side device, the traffic multiplexing effect comes into play, and said PVC (permanent virtual connection) path can be used efficiently and effectively.

Figure 8:
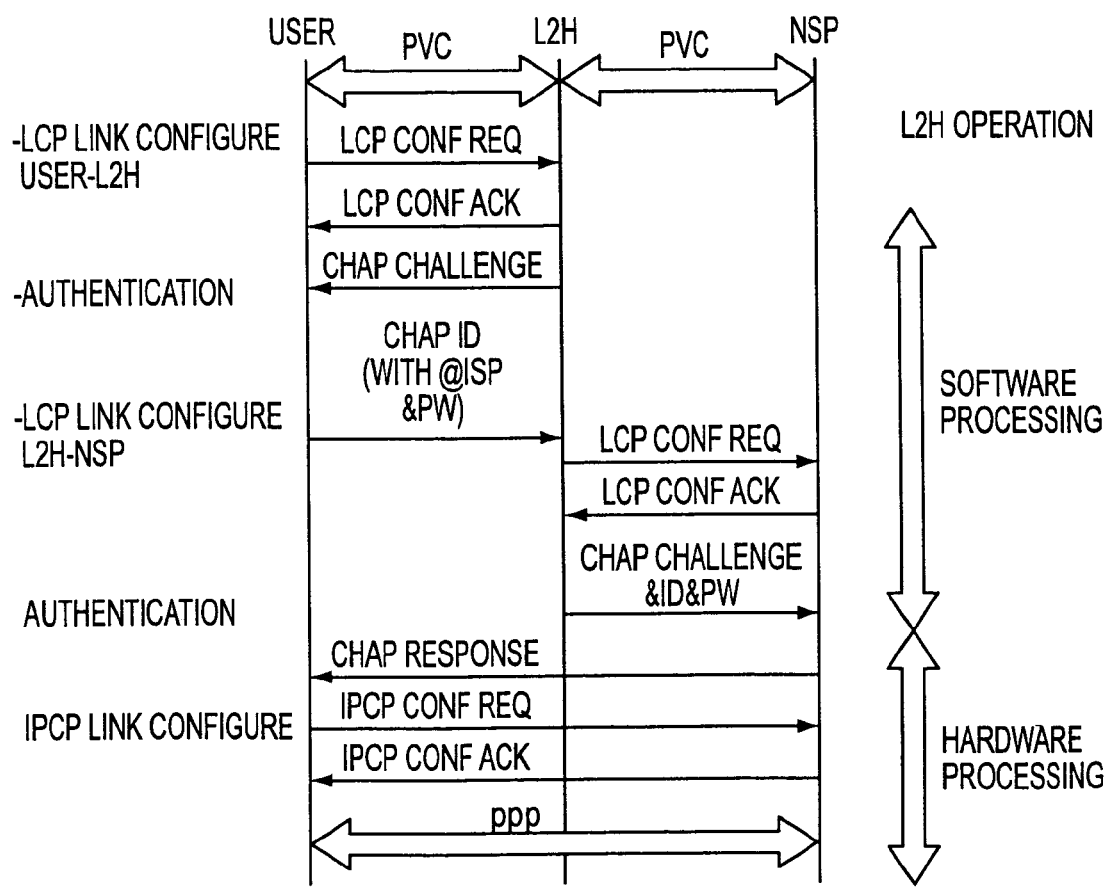
FIG. 8 is an explanatory diagram of the invention's process of establishing layer 2 links.

FIG. 8 is an explanatory diagram of the invention's process of establishing layer 2 links. Layer 2 handler (L2H) can be constituted so that for complex processing—including the negotiation until one connection destination is specified from the information, etc. emitted by the user-side device (User) for establishing a layer 2 link when the layer 2 link connection of the user-side device (User) is initiated—the processing is done by software, and for switching processing of the PVC (permanent virtual connection) path or SVC (switched virtual connection) path once the one connection destination has been specified, high-speed switching is done by hardware.

Figure 9A:
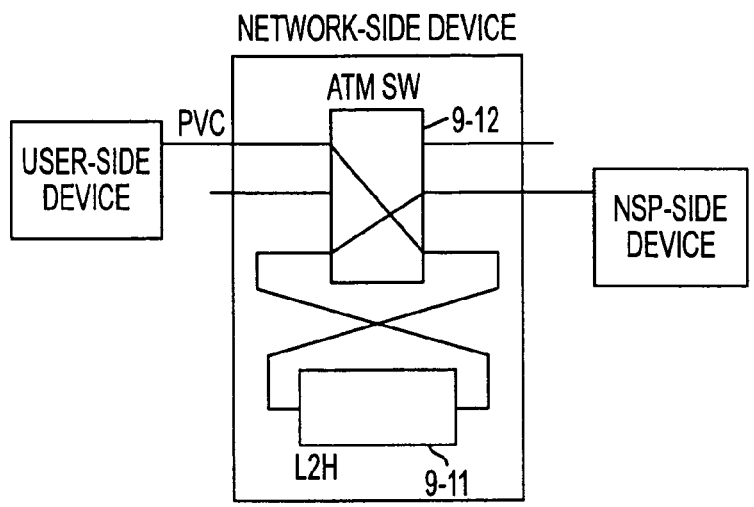
FIGS. 9 (a and b) are an explanatory diagram of an embodiment for PVC (permanent virtual connection) path setting by an ATM switch.
Figure 9B:
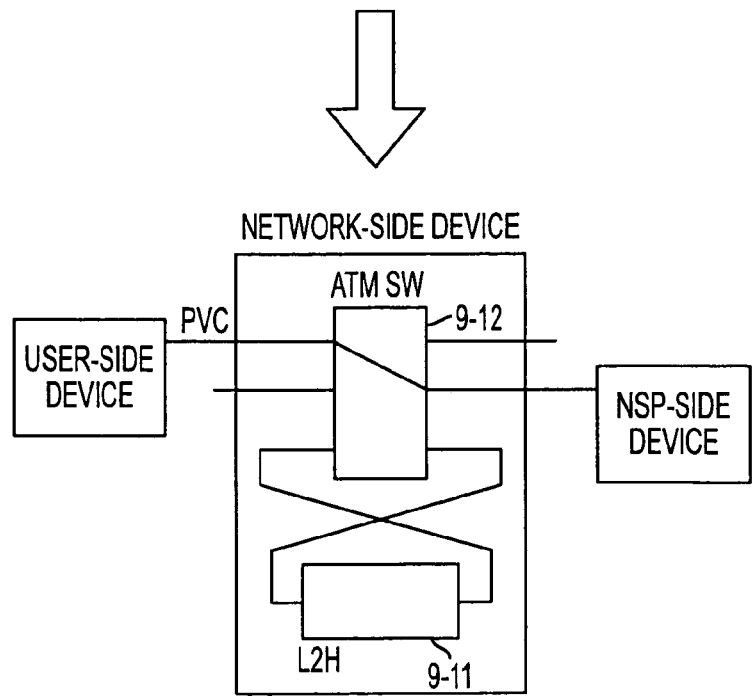

FIG. 9 is an explanatory diagram of the mode of implementation of the invention for PVC (permanent virtual connection) path setting by an ATM switch. As shown in (a) of the diagram, layer 2 handler 9-11 is connected via ATM switch 9-12 by a PVC (permanent virtual connection) path with each user-side device, and specifies one connection destination, such as a network service provider, from the information, etc. emitted by the user-side device for establishing a layer 2 link when the user-side device initiates the layer 2 link connection.

Layer 2 handler 9-11 indicates the specified connection destination to ATM switch 9-12, and ATM switch 9-12, as shown in (b) of the diagram, performs switching on the ATM level to the indicated specified connection destination and connects the PVC (permanent virtual connection) path from the user-side device to the specified connection destination.

The composition is such that the connection on the ATM level is made not within layer 2 handler 9-11; until selection of the specified connection destination, processing is done by layer 2 handler 9-11 by giving instructions to ATM switch 9-12, and switching to make the connection to said specified connection destination is done using ATM switch 9-12.

Figures 10A, 10B:
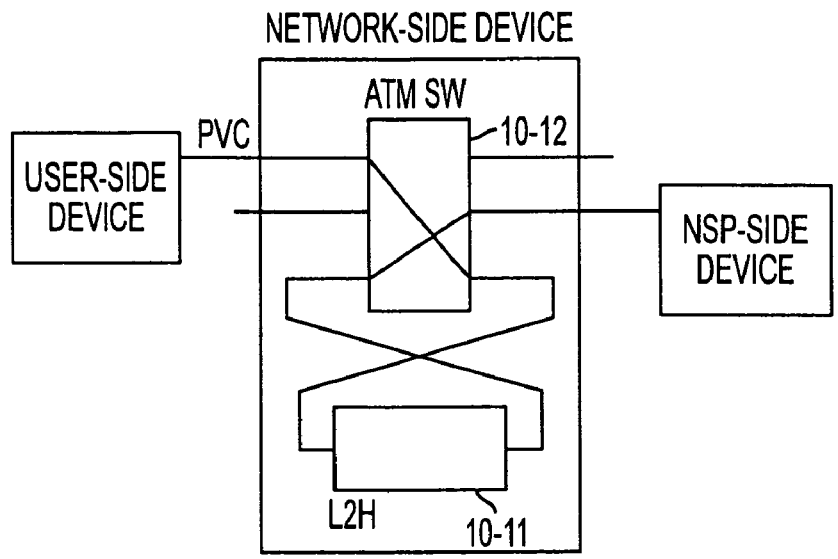
FIGS. 10 (a and b) show, respectively an explanatory diagram of the layer 2 handler of the invention and a conversion table to ATM addresses.

FIG. 10 is an explanatory diagram of the first mode of implementation of this invention having a conversion table to ATM addresses. As shown in (a) of the diagram, between the user-side device and layer 2 handler 10-11, and between layer 2 handler 10-11 and the device on the network service provider (NSP) side, the connection is made by a PVC (permanent virtual connection) path via ATM switch 10-12.

As shown in (b) of the diagram, layer 2 handler 10-11 has a conversion table from specified connection destination names, such as network service provider (NSP) names, to the ATM address of the PVC (permanent virtual connection) path that corresponds to a given specified connection destination.

From the name of the specified connection destination, such as the name of a network service provider (NSP), included in the information for establishing a layer 2 link that is emitted by the user-side device at the time of initiation of a layer 2 link connection with the user-side device, layer 2 handler 10-11 uses said conversion table to obtain the ATM address that corresponds to said connection destination, and makes the ATM connection based on said ATM address.

By such a composition, a connection can be selectively made to a network service provider or other specified connection destination connected by a PVC (permanent virtual connection) path, even if the user-side device is not aware of the ATM address of the specified connection destination.

FIG. 11 is an explanatory diagram of the second mode of implementation of this invention having a conversion table to ATM addresses. As shown in (a) of the diagram, between the user-side device and layer 2 handler 11-11 a connection is made by a PVC (permanent virtual connection) path via ATM switch 11-12, and between layer 2 handler 11-11 and the device on the network service provider (NSP) side, a connection is made by an SVC (switched virtual connection) path via ATM switch 11-12.

As shown in (b) of the diagram, layer 2 handler 11-11 has a conversion table from specified connection destination names, such as network service provider (NSP) names, to the ATM address of the SVC (switched virtual connection) path that corresponds to a given specified connection destination.

From the name of the specified connection destination, such as the name of a network service provider (NSP), included in the information for establishing a layer 2 link that is emitted by the user-side device at the time of initiation of a layer 2 link connection with the user-side device, layer 2 handler 11-11 uses said conversion table to obtain the ATM address that corresponds to said connection destination, and notifies the user-side device of said ATM address.

The user-side device emits the ATM address it has been notified of to ATM switch 11-12, and based on said ATM address, ATM switch 11-12 sets an SVC (switched virtual connection) path to the network service provider (NSP) or other specified connection destination, as shown in (c) of the diagram.

By such a composition, a connection can be selectively made to a network service provider or other specified connection destination via ATM switch 11-12, which is connected by a PVC (permanent virtual connection) path, even if the user-side device is not aware of the ATM address of the specified connection destination.

Figure 12:
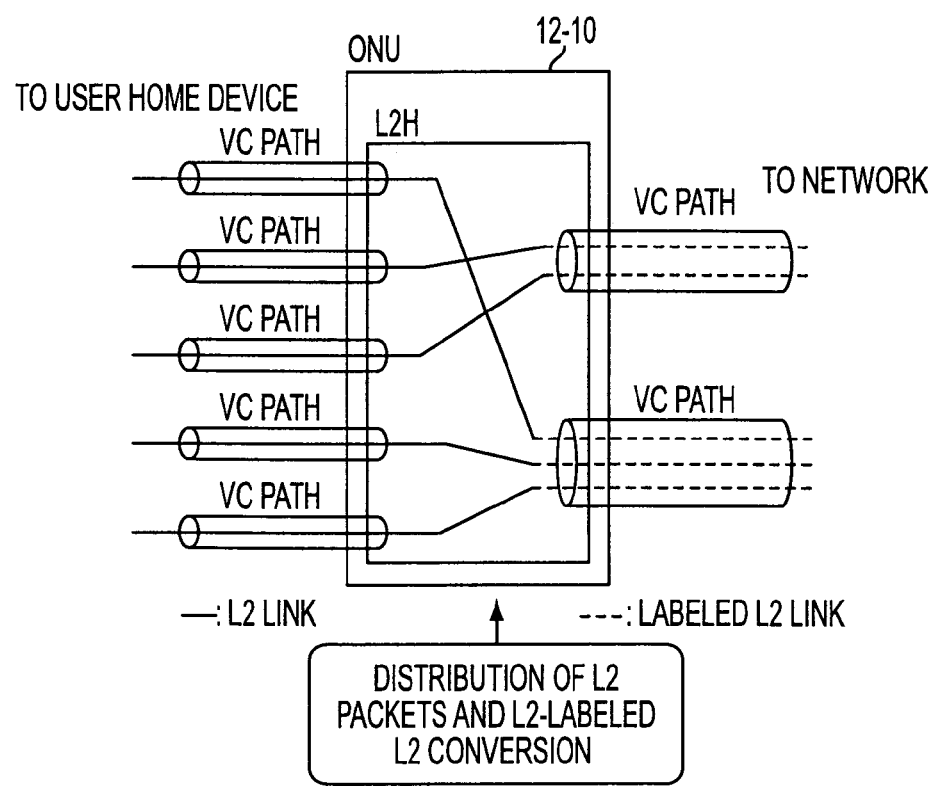
FIG. 12 is an explanatory diagram of the invention's user-side network terminating device having a labeling function.

FIG. 12 is an explanatory diagram of the present invention's user-side network terminating device having a labeling function. In user-side network terminating device (optical network unit (ONU), etc.) 12-10, one connection destination is specified from the information, etc. emitted by the user-side device for establishing a layer 2 link.

Within user-side network terminating device 12-10, labels that identify individual layer 2 links are assigned to layer 2 packets (PPP packets, etc.) that arrive from PVC (permanent virtual connection) paths of the user-side device, the labeled layer 2 packets are distributed to network-side PVC (permanent virtual connection) paths, multiple layer 2 links are multiplexed to network-side PVC (permanent virtual connection) paths, and connections are made between the user side and the network side.

Normally, the link of only one PPP or other protocol packet, which is a layer 2 packet, can be put on a single physical layer circuit. But by converting layer 2 packets to labeled layer 2 packets, multiple layer 2 links can be put on a single physical circuit.

By such a composition, a large number of layer 2 packet links under a contract with few PVC (permanent virtual connection) paths can be set with respect to the network side while handling layer 2 packets by a normal protocol, such as PPP, without the user-side device having anything to do with labeled layer 2 links.

Figure 13:
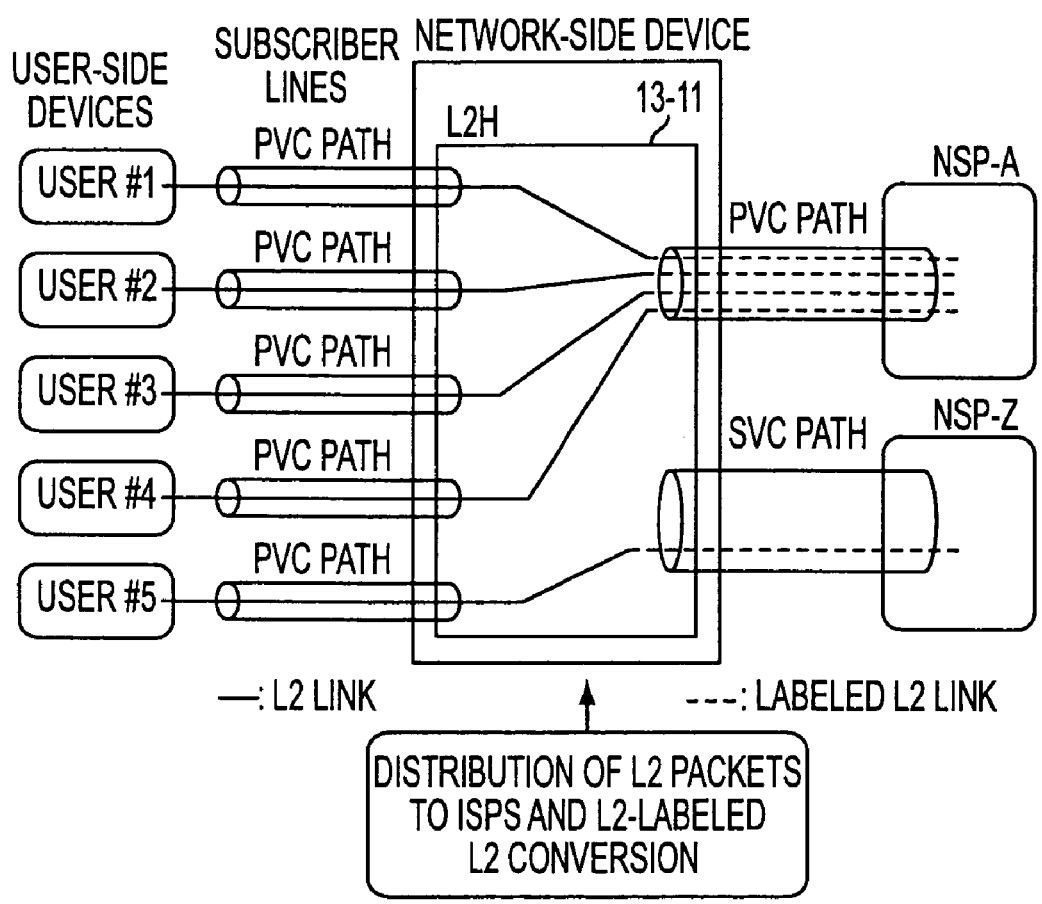
FIG. 13 is a diagram showing an embodiment for layer 2 switching for PVC (permanent virtual connection) and SVC (switched virtual connection) paths.

FIG. 13 is a diagram showing a mode of implementation of this invention for layer 2 switching for PVC (permanent virtual connection) and SVC (switched virtual connection) paths. If the connection between each user-side #1 to #5 and layer 2 handler 13-11 is made by a PVC (permanent virtual connection) path, and the connection of layer 2 handler 13-11 with some devices on the network service provider (NSP-A) side is made by a PVC (permanent virtual connection) path and with other devices on the network service provider (NSP-B) side is made by an SVC (switched virtual connection) path, then layer 2 handler 13-11 specifies a single connection destination, such as a network service provider (NSP) from information, etc. emitted by the user-side device for establishing a layer 2 link.

If the relevant specified connection destination is connected by a PVC (permanent virtual connection) path, layer 2 handler 13-11 emits a layer 2 packet to said PVC (permanent virtual connection) path, but if the relevant specified connection destination is not connected by a PVC (permanent virtual connection) path, it newly sets a path to said specified connection destination using an SVC (switched virtual connection) path.

With such a layer 2 handler 13-11, PVC (permanent virtual connection) and SVC (switched virtual connection) paths can be used efficiently by using PVC (permanent virtual connection) paths only for connections to network service provider (NSP) or other specified connection destinations connected to a large number of user-side devices, and using SVC (switched virtual connection) paths for connections to specified connection destinations connected to only a small number of user-side devices, thereby making it possible to economically set paths to network service provider (NSP) or other specified connection destinations.

Figure 14A:
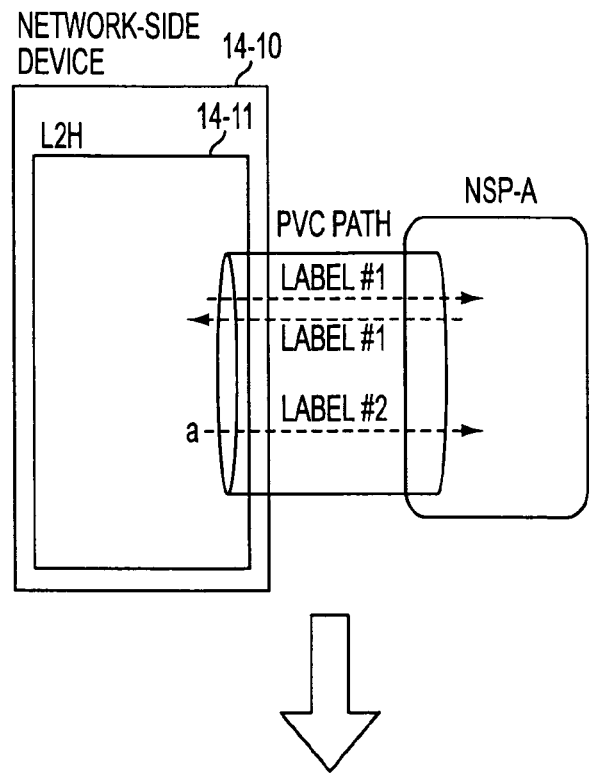
FIGS. 14 (a and b) are an explanatory diagram of a mode of implementation of the invention that assigns arbitrary labels.
Figure 14B:
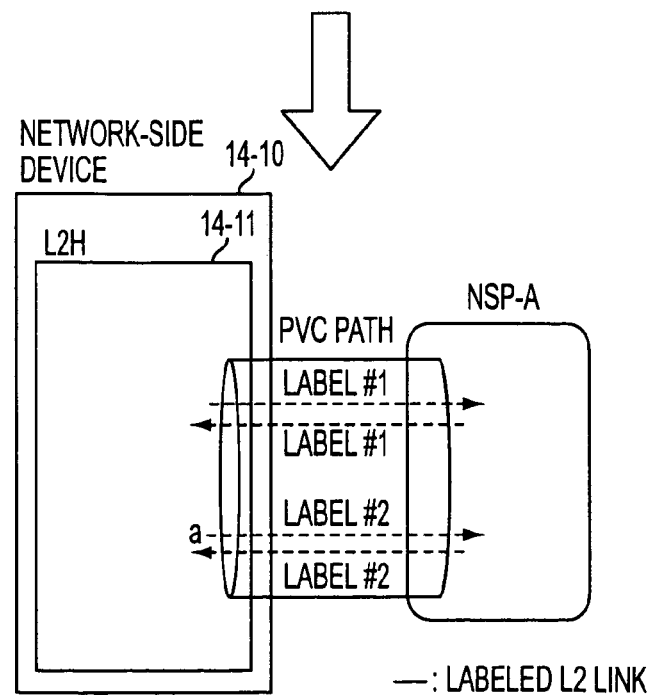

FIG. 14 is an explanatory diagram of a mode of implementation of the present invention that assigns arbitrary labels. In the labeling in the aforesaid modes of implementation shown in FIGS. 6 and 7, etc., the device on the side that newly assigns labels to layer 2 links and emits labeled packets selects arbitrary available label numbers and assigns to layer 2 packets, and the device that receives said labeled layer 2 packets assigns to the return-direction link corresponding to a received link a label of the same number as the number of said assigned label.

As shown in (a) of FIG. 14, if layer 2 handler 14-11 within network-side device 14-10 extends a new link 'a' when a layer 2 link to which label #1 has been assigned is set between it and a network service provider (NSP-A), then layer 2 handler 14-11 selects and allocates an arbitrary label #2 that is not currently being used and transmits a layer 2 packet to which said label #2 is assigned.

As shown in (b) of the diagram, the network service provider that receives layer 2 packet bearing label #2 (NSP-A) assigns the same label #2 as the received layer 2 packet to the link to layer 2 handler 14-11 corresponding to the link on which the layer 2 packet bearing label #2 was received. Such a labeling system makes it possible to easily label layer 2 links in both directions.

Figure 15A:
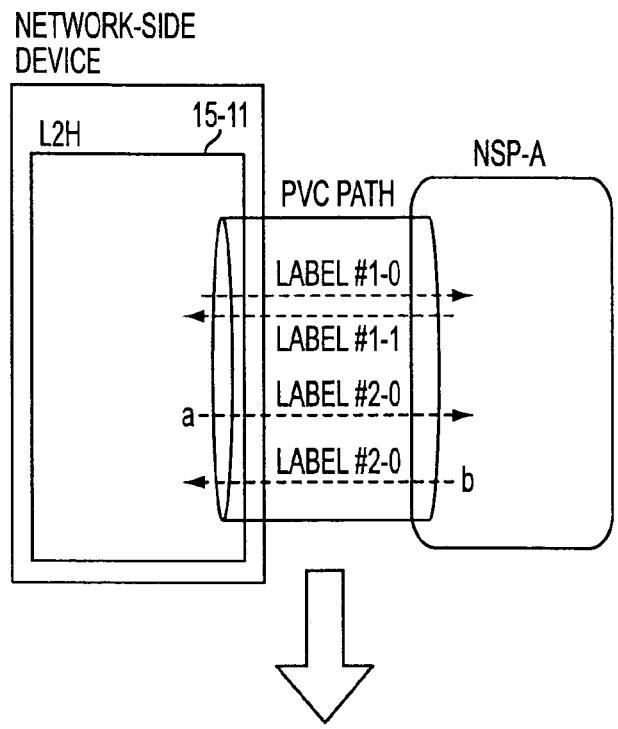
FIGS. 15 (a and b) are an explanatory diagram of a mode of implementation of the invention that does labeling to prevent collisions.
Figure 15B:
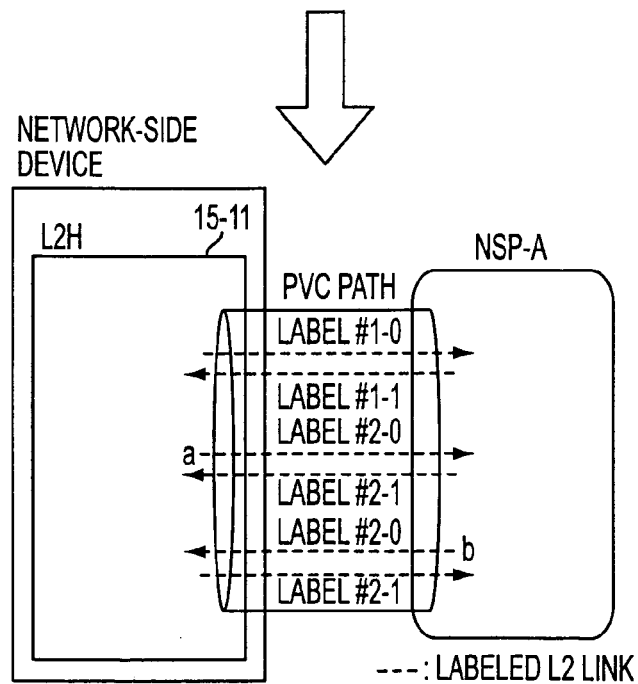

FIG. 15 is an explanatory diagram of a mode of implementation of the invention that does labeling to prevent collisions. If the same label number is assigned to a layer 2 link so as to form the pair described above, then a different marking is made on each label, as between the side that first selects an arbitrary available label number and emits a labeled layer 2 packet, and the side that assigns the same label number to the link of the pair on the side that receives said labeled layer 2 packet and emits it.

As shown in (a) of FIG. 15, if layer 2 handler 15-11 sets a new link 'a' when a bidirectional layer 2 link to which label #1-0 and label #1-1 have been assigned is set between it and a network service provider (NSP-A), then layer 2 handler 15-11 selects and allocates an arbitrary label #2-0 that is not currently being used and transmits a layer 2 packet to which said label #2-0 is assigned.

At this time, the operation of simultaneously setting link 'b' also from the network service provider (NSP-A) device side is begun, and if at that time by chance the same label #2-0 is selected and assigned, then layer 2 handler 15-11 will recognize it as the pair of link 'a', even though the two are separate links.

Thus, for the label number selected and allocated by the originating device, a labeled layer 2 packet with a label number assigned, for example, the marking "0 is transmitted, and the other device that receives the layer 2 packet to which this marking is assigned puts, for example, the marking "1 on the label number of the layer 2 packet to be emitted to the link of the pair.

As shown in (b) of the diagram, because it can be assumed that label number #2-1 is assigned to the layer 2 packet that is transmitted to the link of the pair of link 'a' to which label number #2-0 was assigned, layer 2 handler 15-11 is able to distinguish by label number #2-0 assigned as link 'b' that the device on the network service provider (NSP-A) side newly tries to set, and while being a simple labeling system, label number collisions can be avoided even if both devices do label management independently.

Figure 16A:
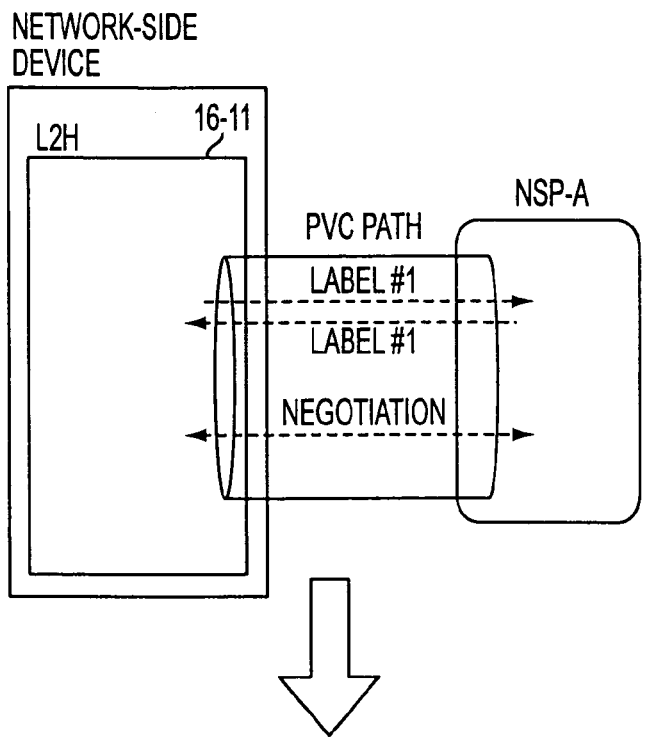
FIGS. 16 (a and b) are an explanatory diagram of a mode of implementation of the invention that does labeling by negotiation.
Figure 16B:
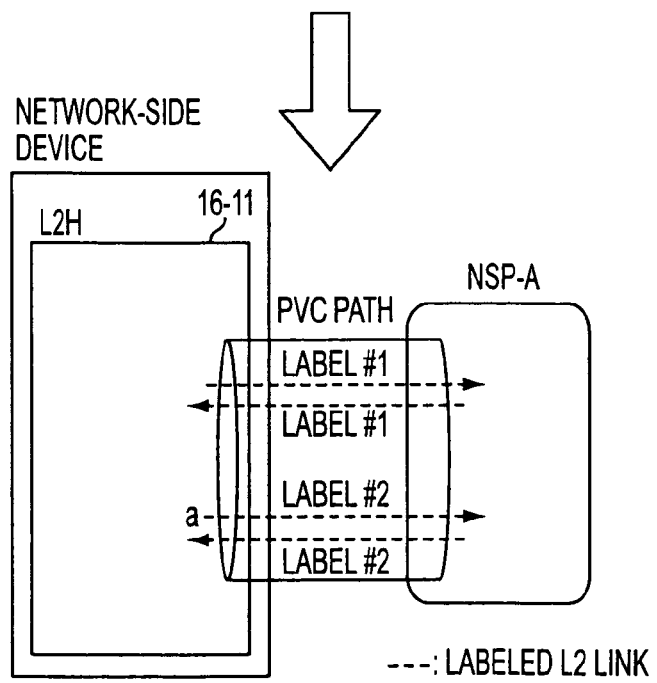

FIG. 16 is an explanatory diagram of a mode of implementation of the invention that does labeling by negotiation. As shown in (a) of the diagram, if layer 2 handler 6-11 sets a new link when a layer 2 link to which label #1 is assigned is set between it and a network service provider (NSP-A), then a negotiation takes place mutually with the network service provider (NSP-A) concerning label numbers, and, as shown in (b) of the diagram, an arbitrary label #2 that is not currently being used is selected and decided upon, and a bidirectional link of label #2 is set. Negotiation makes it possible to assign labels without any collisions.

Figure 17A:
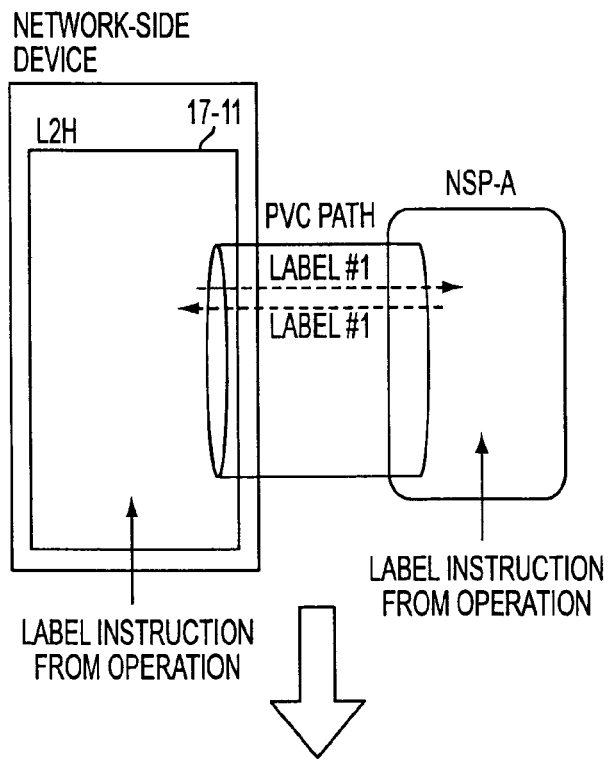
FIGS. 17 (a and b) are an explanatory diagram of a mode of implementation of the invention that does labeling by network operation.
Figure 17B:
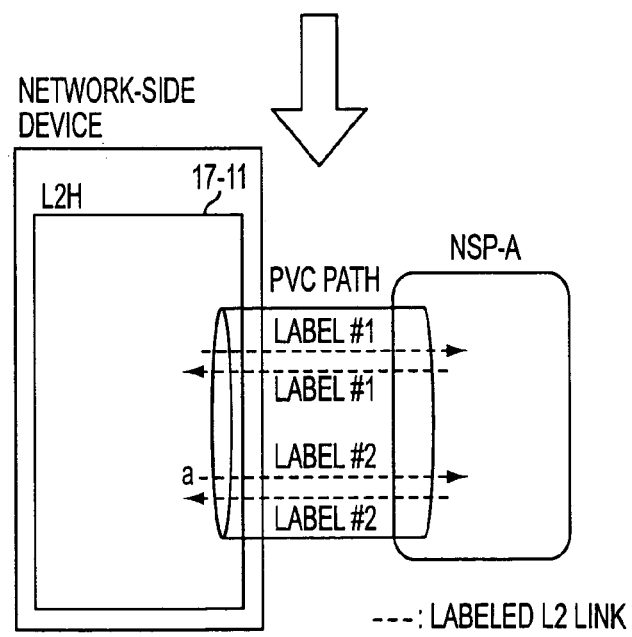

FIG. 17 is an explanatory diagram of a mode of implementation of the invention that does labeling by network operation. As shown in (a) of the diagram, if a new link is set between layer 2 handler 17-11 and a network service provider (NSP-A), then the label to assign is prescribed by operation of the network's management operation device.

Layer 2 handler 17-11 and the network service provider (NSP-A) can do labeling without collisions by assigning to the layer 2 links labels prescribed by operation of the network management operation device.

Figure 18:
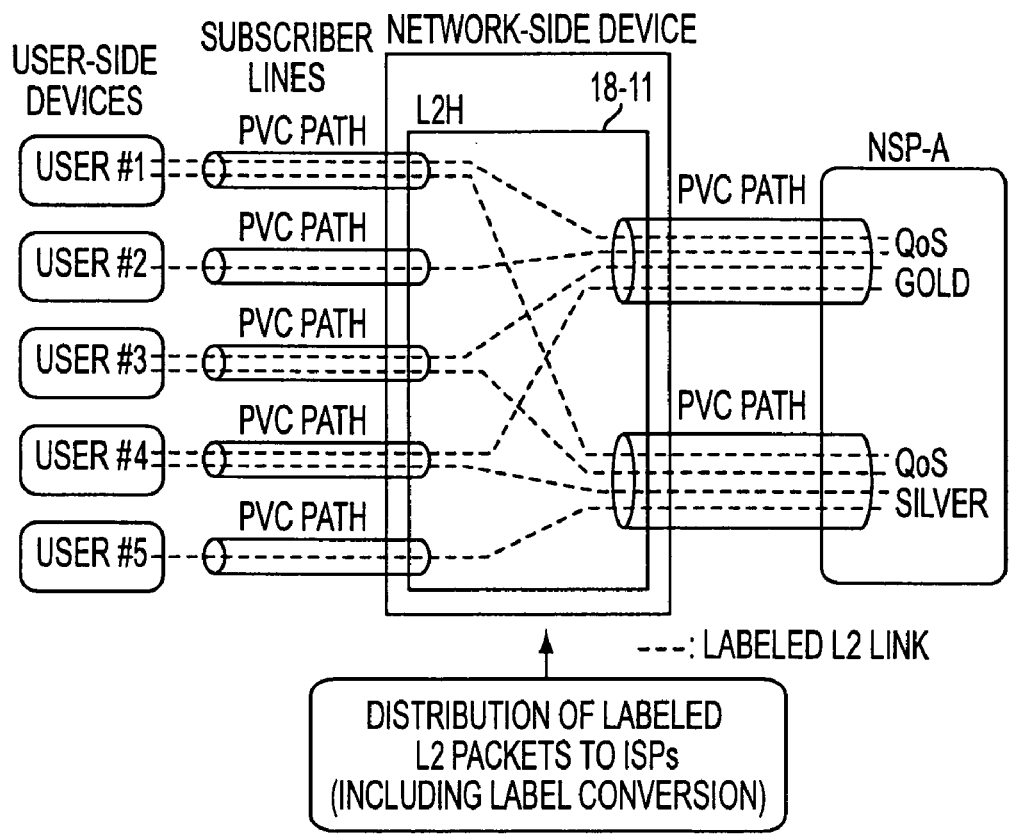
FIGS. 18 (a and b) are an explanatory diagram of a mode of implementation of the invention that does labeling according to QoS.

FIG. 18 is an explanatory diagram of a mode of implementation of the invention that does labeling according to quality-of-service (QoS) class. The user-side device or user-side network terminating device (ONU) assigns labels classified by the requested quality of service (QoS) and emits layer 2 packets, and based on the labels, layer 2 handler 18-11 distributes them to PVC (permanent virtual connection) paths classified by each QoS. At this time, label conversion is also done, and layer 2 packets of the same QoS are made multiplex and emitted on a single PVC (permanent virtual connection) path.

Figure 19:
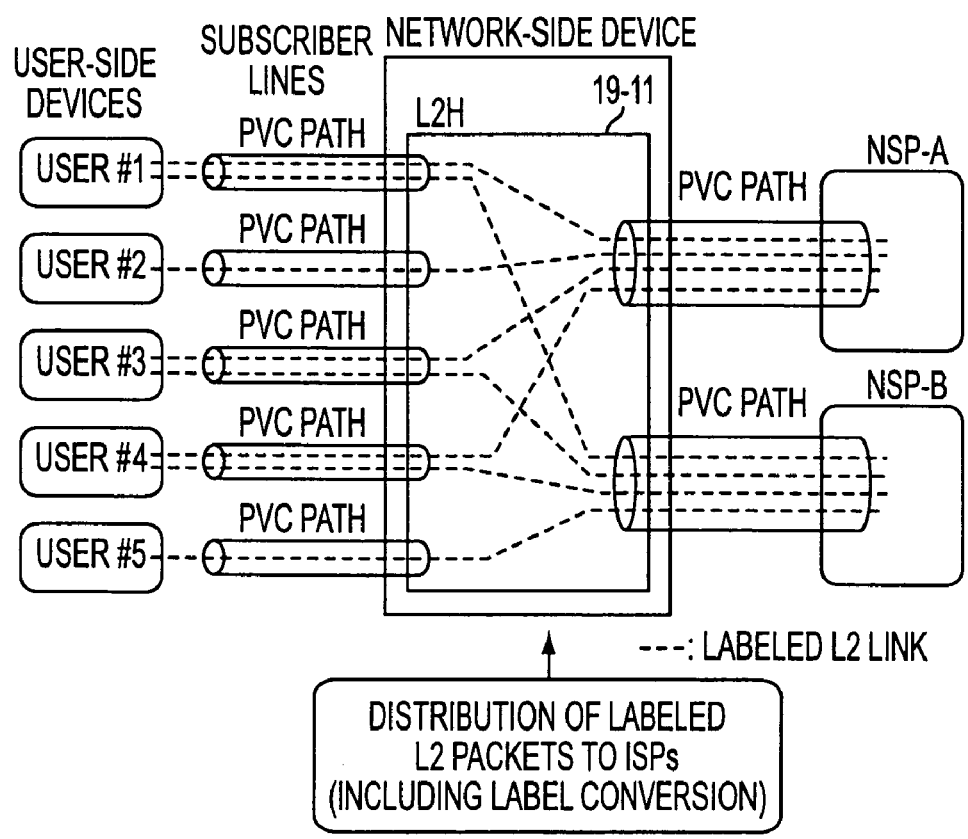
FIG. 19 is an explanatory diagram of a mode of implementation of the invention that does labeling according to connection destination.

FIG. 19 is an explanatory diagram of a mode of implementation of the invention that does labeling according to connection destination. The user-side device or user-side network terminating device (ONU) assigns labels classified by the connection destination and emits layer 2 packets, and based on the labels, layer 2 handler 19-11 distributes them to PVC (permanent virtual connection) paths classified by each connection destination. At this time, label conversion is also done, and layer 2 packets of the same connection destination are made multiplex and emitted on a single PVC (permanent virtual connection) path.

Figure 20:
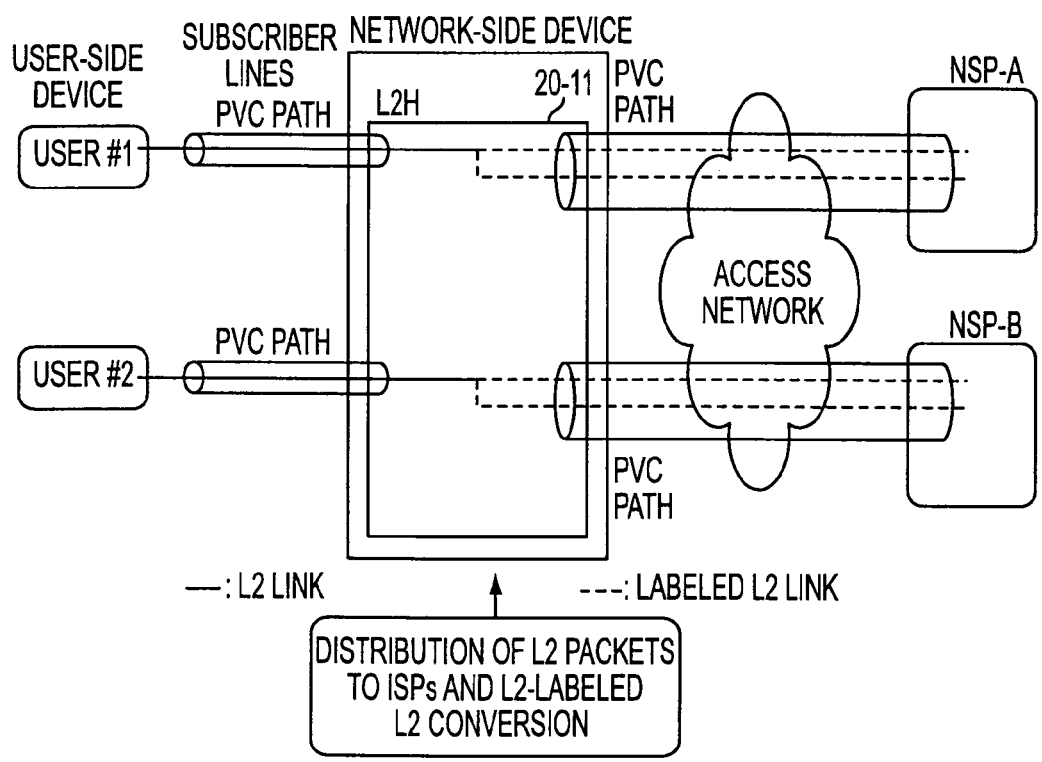
FIG. 20 is an explanatory diagram of a layer 2 handler of the invention that does labeling according to distribution type of service.

FIG. 20 is an explanatory diagram of a layer 2 handler of the invention that does labeling according to distribution type of service (ToS). Based on the value of the distribution type of service (ToS) field in the IP packet within a layer 2 packet, layer 2 handler 20-11 assigns QoS-classified labels to layer 2 packets according to the value of the ToS field, and emits them.

Here, for distribution type of service (ToS), information on the type of distribution route requested from the user-side device determines, in accordance with it, the selection of the distribution route, such as whether to use a route whose delay is as small as possible, whether to use a route whose throughput is as large as possible, or whether to use a route whose reliability is as high as possible.

In an access network that connects paths to network service providers (NSP-A, B), QoS control is done according to the assigned labels. By assigning labels classified by QoS to packets from the user-side device, flexible QoS control becomes possible in an access network.

Figure 21:
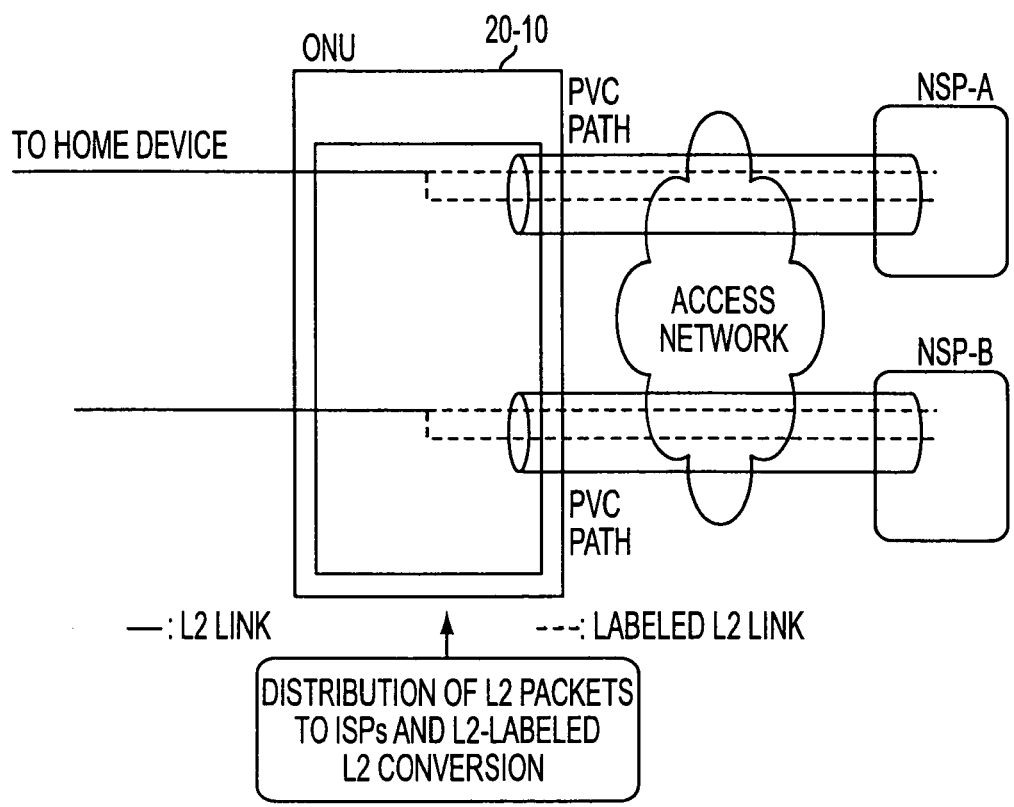
FIG. 21 is an explanatory diagram of a user-side network terminating device (ONU) of the invention that does labeling according to distribution type of service.

FIG. 21 is an explanatory diagram of a user-side network terminating device (ONU) of this invention that does labeling according to distribution type of service. Based on the value of the distribution type of service (ToS) field in the IP packet within a layer 2 packet, user-side network terminating device (ONU) assigns "ToS" classified labels to layer 2 packets according to the value of the ToS field, and emits them.

In an access network that connects paths to network service provides (NSP-A, B), QoS control is done according to the assigned labels. By assigning labels classified by QoS to packets from the user-side device, flexible QoS control becomes possible in an access network.

Figure 22:
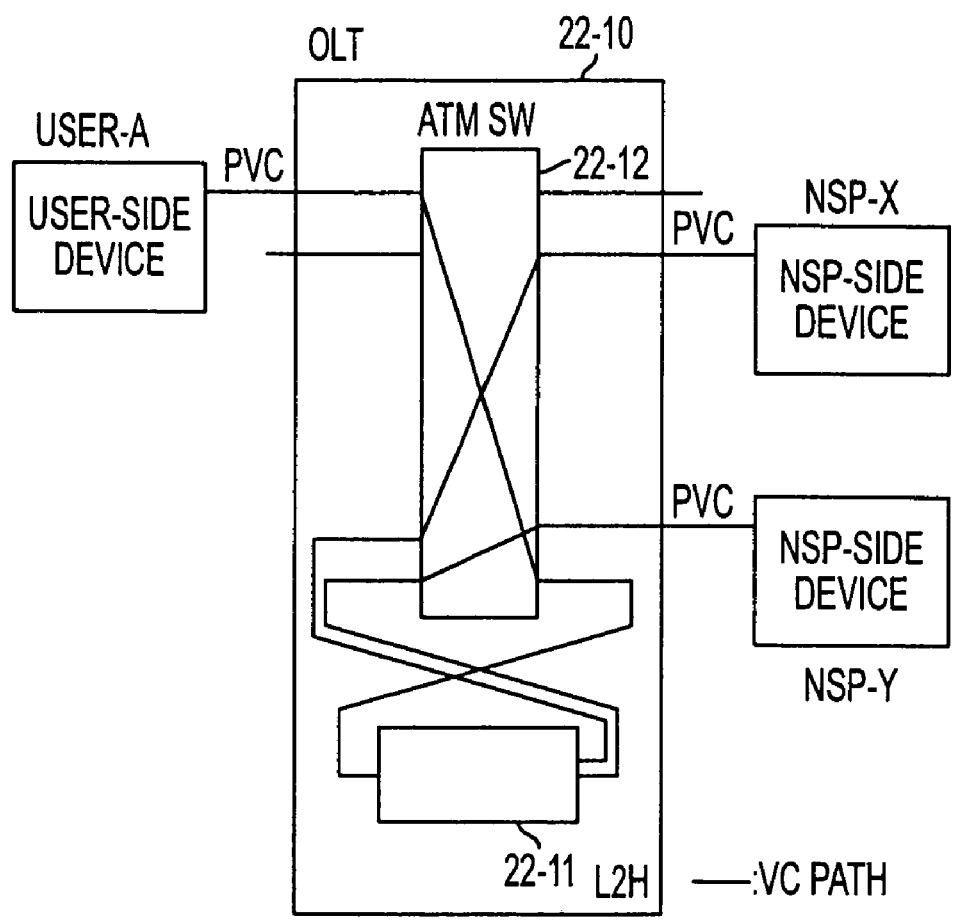
FIG. 22 is a diagram that shows an embodiment in which a layer 2 handler of the invention is provided within a subscriber line collection device (OLT)

FIG. 22 shows a mode of implementation in which a layer 2 handler of this invention is provided within a subscriber line concentrator device (optical line terminator, OLT). It has layer 2 handler 22-11 and ATM switch 22-12 within subscriber line concentrator device (OLT) 22-10, and between the user-side device and layer 2 handler 22-11 a PVC (permanent virtual connection) path is extended via ATM switch 22-12.

Also, between layer 2 handler 22-11 and network service provider-side device (NSP-X) and network service provider-side device (NSP-Y) a PVC (permanent virtual connection) path is extended via ATM switch 22-12. An example of the composition of layer 2 handler 22-11 is described as follows.

Figure 23A:
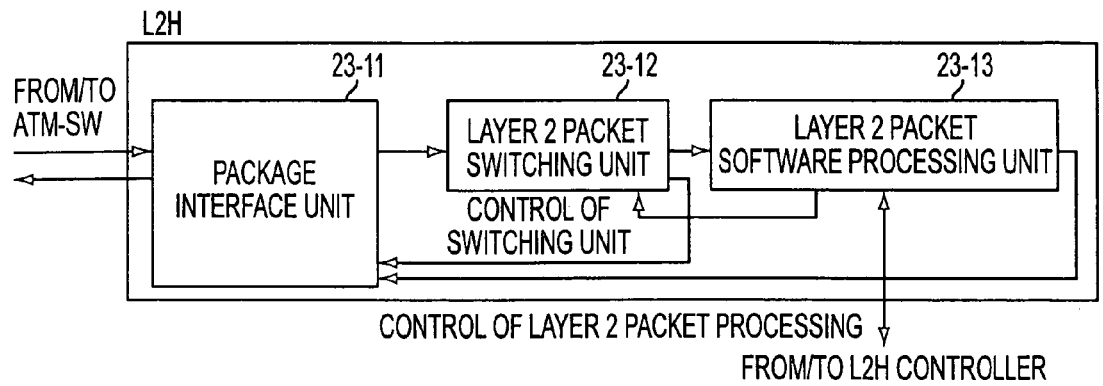
FIGS. 23 (a, b, c) show an explanatory diagram of an example of the composition of the layer 2 handler of the invention.
Figure 23B:
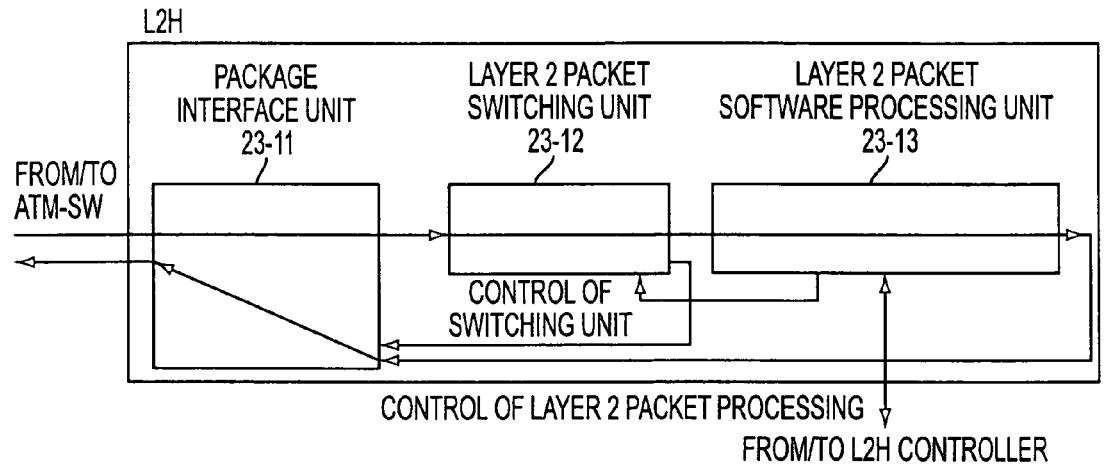
Figure 23C:
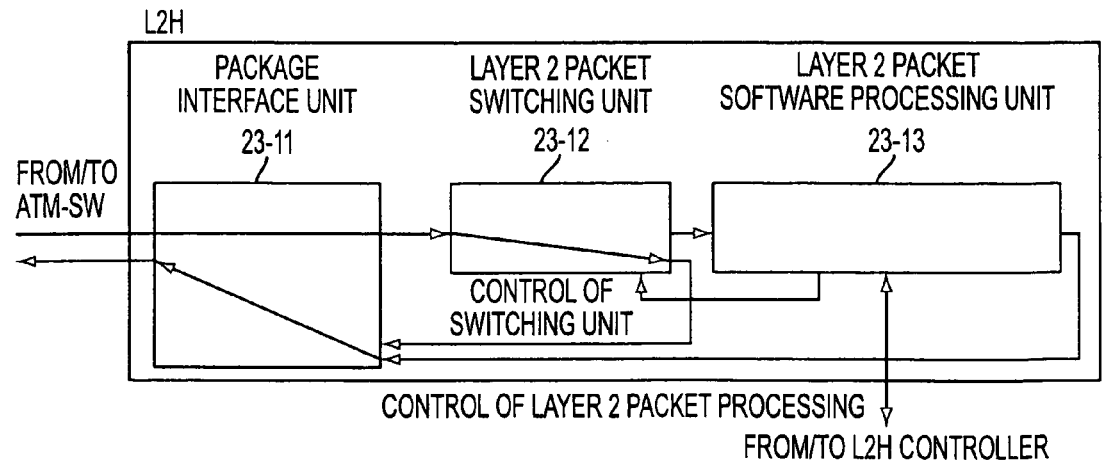

FIG. 23 is an explanatory diagram of an example of the composition of the layer 2 handler of the present invention. In the diagram, (a) shows an example of the composition, (b) shows the pass-through route of a layer 2 packet during software processing, and (c) shows the pass-through route of a layer 2 packet during hardware processing.

Package interface unit 23-11 receives cells from the ATM switch and assembles PPP or other layer 2 packets. Also, layer 2 packets are broken up into ATM cells and passed to the ATM switch.

Layer 2 packet switching unit 23-12 is hardware that performs switching and labeling of PPP and other layer 2 packets; among the layer 2 packets, for packets that require negotiation, processing is passed to layer 2 packet software processing unit 23-13 as shown in (b) of the diagram, and for packets with a link whose connection destination is specified, switching and labeling is done and the packets are emitted to the ATM switch via package interface unit 23-11 as shown in (c) of the diagram.

Layer 2 packet software processing unit 23-13 receives packets that require negotiation and performs negotiation. In this process, the desired connection destination is specified from the user side, and control of layer 2 packet switching unit 23-12 is carried out.

Figure 24:
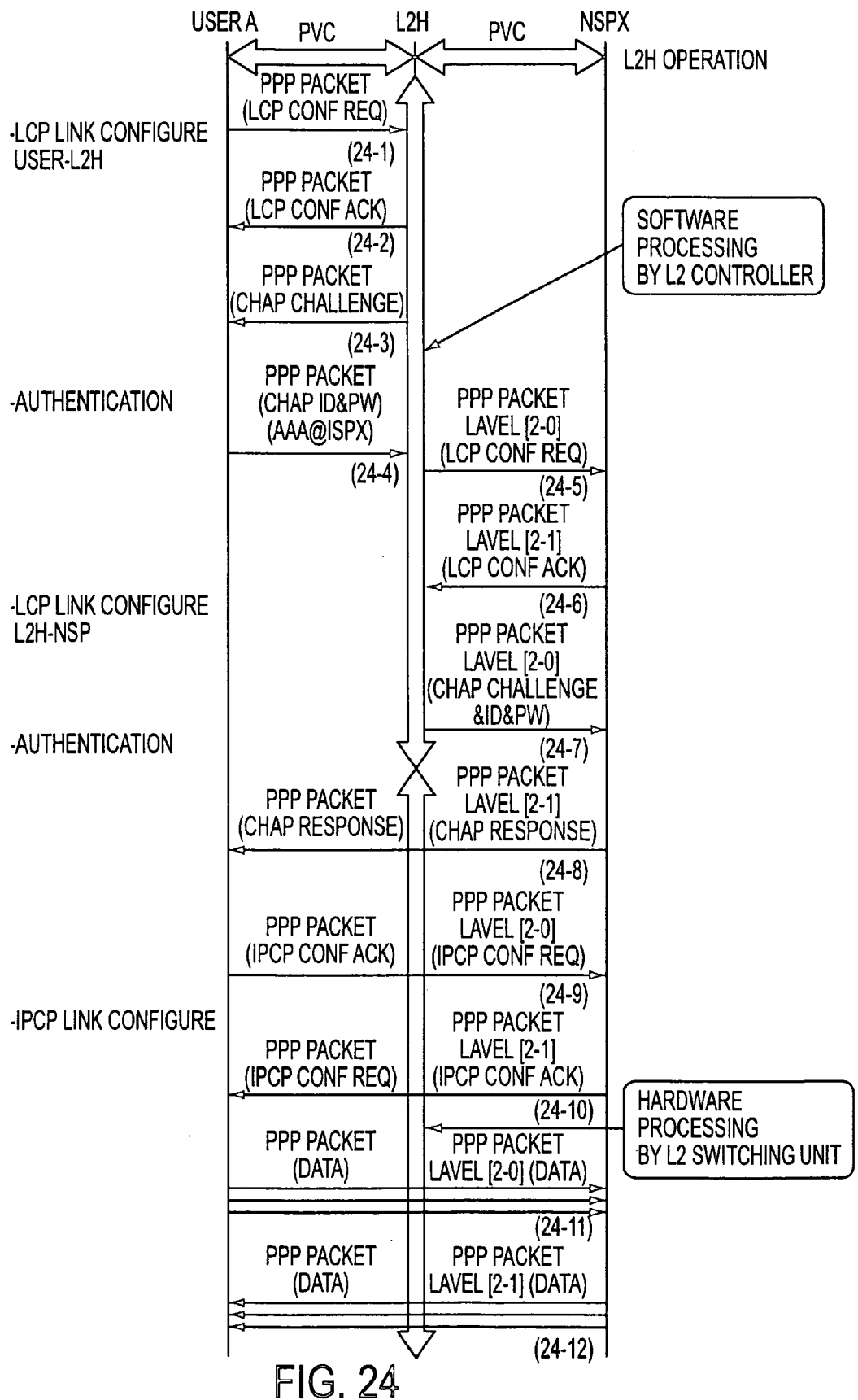
FIG. 24 is a diagram that shows the sequence of operations of the layer 2 handler of the invention.

FIG. 24 is an explanatory diagram of the operations of the layer 2 handler of this invention. User A initiates a PPP layer 2 protocol transmission sequence. First, in order to set the PPP connection, an LCP_ConfReq packet is emitted in PPP-over-ATM format on the PVC to the layer 2 handler (24-1).

This packet is received by the layer 2 handler (L2H), and at the layer 2 handler, the PPP packet is taken out by the ATM interface, it goes through the layer 2 switch engine, and it is received by the layer 2 controller. At the layer 2 controller, software processing of this packet is initiated, and an LCP_ConfAck packet is sent back to the user side (24-2).

Also, as an authentication sequence, the layer 2 handing device emits a CHAP_Challenge packet (24-3). In response to this, user A emits his user ID and password (24-4). At this time user A emits his own user ID in the format "aaa@nspx".

This is a format in which one specifies the user ID "aaa" followed by @ and the connection destination network service provider (NSP) name "nspx". By the layer 2 controller receiving a user ID of this format, the layer 2 controller specifies the network service provider (NSP) name "nspx" to be connected with this user.

Using the PVC (permanent virtual connection) path to the network service provider (NSP) name "nspx" to be connected, the layer 2 handler emits to network service provider "nspx" an LCP_ConfReq packet for connection setting in labeled PPP-over-ATM format.

At this time, the layer 2 controller obtains from the label management table a label number, here [2], that is not being used in the PVC (permanent virtual connection) path to network service provider (NSP) "nspx". Then to this label number it emits as the label of [2-0], including marking [0] meaning that it is an emission from the label management side (24-5).

At the device of network service provider "nspx", the LCP_ConfReq of the PPP packet of label [2-0] is received, label [2-1] of the transmission packet that corresponds to received label [2-0] is added, and the LCP_ConfAck of the PPP packet is returned (24-6). Here, for label [2-1], the label number is 2, and marking [1], which means that it is an emission from the label number non-management side, is added.

When the PPP package to which label [2-1] is assigned is received at the layer 2 handler, said packet is recognized as the packet that is paired with [2-0], and processing is done.

In this way, multiple PPP packets can be multiplexed on a single PVC (permanent virtual connection) path by assigning labels to PPP packets between the layer 2 handler and the network service provider (NSP). And by adding a marking that distinguishes whether it is from the label number management side or non-management side, label collisions are avoided even if the management of label numbers is done separately by each device.

Next, the layer 2 handler emits user A's ID and password to network service provider (NSP) "nspx" (24-7). And the layer 2 controller of the layer 2 handler sets the following hardware operation with respect to the layer 2 switch engine unit.

For the PPP packet that arrives from user A's PVC (permanent virtual connection) path it transfers it as a PPP packet to which the label of [2-0] is assigned to the PVC (permanent virtual connection) path to network service provider (NSP) "nspx" (24-9, 24-11).

For the PPP packet to which the label of [2-1] is assigned that arrives from the PVC (permanent virtual connection) path of network service provider "nspx", it removes said label and transfers it to the PVC (permanent virtual connection) path of user A (24-8, 24-10, 24-12).

By this setting, in the subsequent PPP packet communication between user A and network service provider "nspx", transfer is done by hardware via the layer 2 handler.

Using this communication protocol makes it possible to realize the network service provider selection function although it is a PVC (permanent virtual connection) path, and makes it possible to have efficient operation of the network by the traffic line collection effect.

Figure 25:
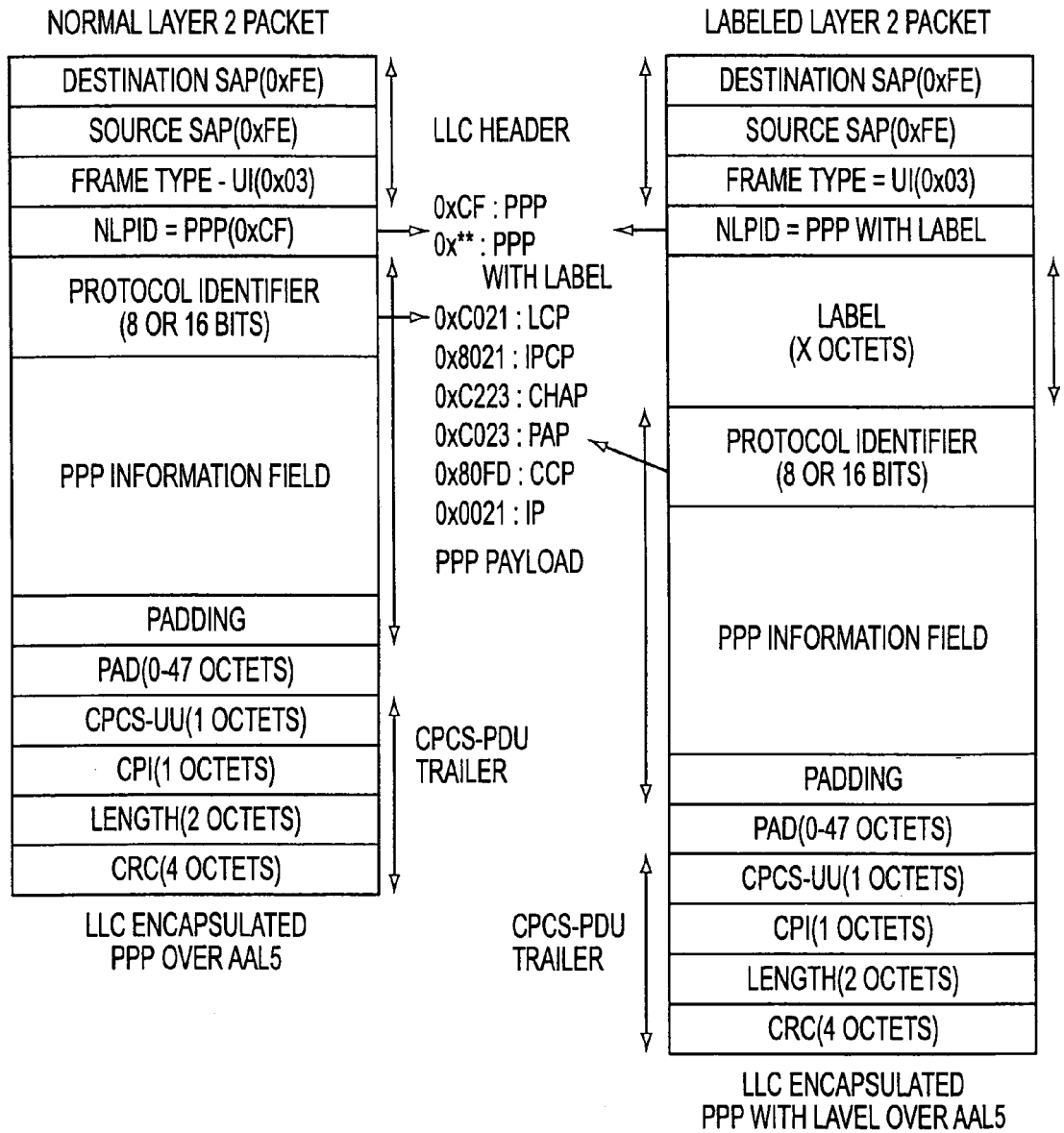
FIG. 25 is a diagram that shows an example of the format of a labeled layer 2 packet of the invention.
Figure 26:
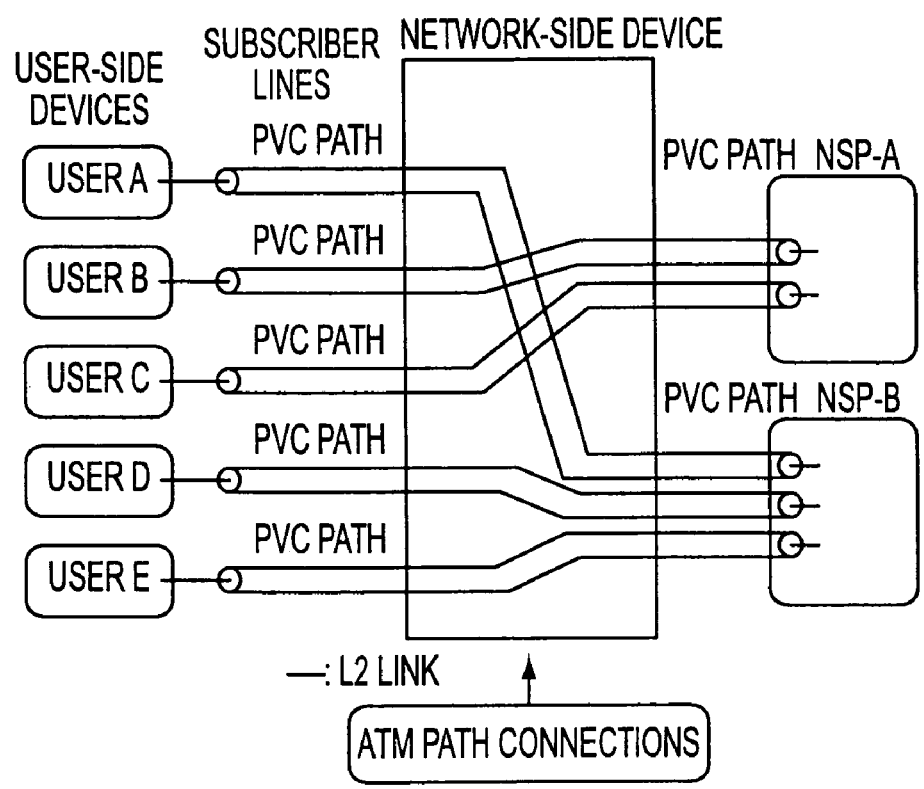
FIG. 26 is an explanatory diagram of connections between user-side devices and devices on the network service provider (NSP) side by conventional PVC (permanent virtual connection)
Figure 27:
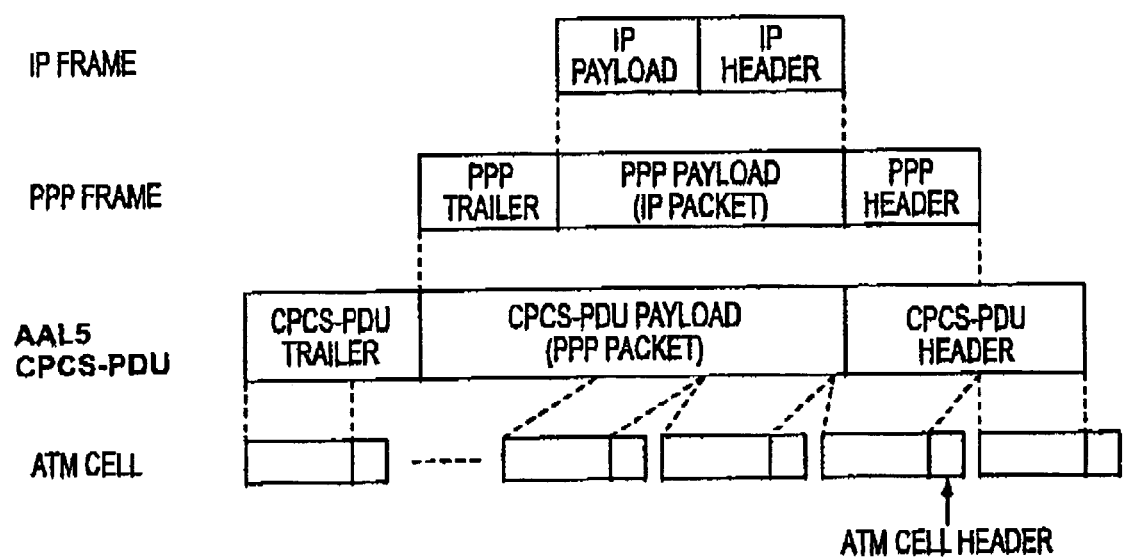
FIG. 27 is a diagram that shows the frame composition if IP frames are transmitted along ATM paths.

FIG. 25 shows an example of the format of a labeled layer 2 packet of this invention. In the diagram, (a) shows the usual PPP-over-ATM packet format, and (b) shows the labeled PPP-over-ATM packet format. The assigned label is stored in the region of (b) indicated by "Label".

As explained above, the present invention makes it possible to select and connect one of specified connection destinations, even if the user-side device is connected by a permanent virtual connection path, by specifying the path of one of the connection request destinations from layer 2 link information emitted from the user-side device connected by a permanent virtual path when a layer 2 link connection request is made, and connecting the permanent virtual connection path of the user-side device to the path of one of the connection request destinations.

Normally with layer 2 packets, only one link can be set on one physical layer circuit, but by converting layer 2 packets to labeled layer 2 packets, it becomes possible to set multiple layer 2 links on one physical layer circuit, and to have efficient operation of the network by the traffic multiplexing effect.

By associating assigned labels with specified connection destinations, switching can be done that is logically separated by the assigned labels, without referring to the IP address in the layer 3 IP header, etc., even if user devices of multiple companies having the same private address are accommodated in layer 2.

The high-speed switching by hardware can be done by doing the switching by the assigned labels of layer 2 packets, without referring to the IP address in the layer 3 IP header, etc.

With the switching by the IP address in the layer 3 IP header, etc., it is impossible to specify the intermediate route nodes, etc., but with switching by layer 2 labels, it becomes possible to specify physical circuit intermediate route nodes, it becomes possible to disperse the load by establishing bypass routes in the event of congestion or fault and doing switching to multiple physical circuit routes, and it is possible to carry out flexible QoS control by associating assigned labels and quality-of-service (QoS) classes.

By associating specified connection destination names and ATM addresses, it becomes possible to selectively connect to network service provider (NSP) or other specified connection destinations that are connected by permanent virtual connection paths, even if the user-side device is unaware of the ATM addresses of the specified connection destinations.

What is claimed is:

1. A layer 2 link handler provided in a network-side device, the network-side device being connected to each of a plurality of user-side devices by a respective user-side layer 1 permanent virtual connection (PVC) path and connected to each of a plurality of network service providers (NSPs) via one of a NSP-side layer 1 PVC path and a layer 1 switched virtual connection (SVC) path, the layer 2 link handler comprising:

a path specification means that specifies one path between the network-side device and one of the plurality of NSPs based on layer 2 link information that is emitted from one of the plurality of user-side devices at a time of a layer 2 link connection request; and a path connection means that causes said respective user-side layer 1 PVC path between said network-side device and the one of the plurality of user-side devices to connect to the one specified path, wherein said path connection means includes a labeling means that, based on the layer 2 link information emitted from the one of the plurality of user-side devices at the time of the layer 2 link connection request, assigns a label to each layer 2 packet, where the label is one of one or more available label numbers when a label is newly assigned to each layer 2 packet or a different label number when a layer 2 packet is rejected by the one of the plurality of NSPs and is returned to the network-side device because the layer 2 packet is labeled with a same label number as another labeled layer 2 packet, and said path connection means further includes a transfer means that transfers the labeled layer 2 packet to the one specified path.

2. The layer 2 link handler as described in claim 1, wherein said path connection means, switching on a layer 2 packet level, transfers packets that arrive from said respective user-side layer 1 PVC path between said network-side device and the one of the plurality of user-side devices to the one specified path.

3. The layer 2 link handler as described in claim 1, wherein said path specification means further includes a setting means that causes the specified path to be connected between the network-side device and the one of the plurality of NSPs.

4. The layer 2 link handler as described in claim 1, wherein said transfer means transfers the labeled layer 2 packet to the one specified path according to the label in the labeled layer 2 packet.

5. The layer 2 link handler as described in claim 4, wherein said labeling means assigns the label according to a quality-of-service class of the respective user-side layer 1 PVC path between the network-side device and the one of the plurality of user-side devices.

6. The layer 2 link handler as described in claim 4, wherein said labeling means assigns the label according to the one specified path.

7. The layer 2 link handler as described in claim 4, wherein said labeling means assigns the label according to a type of service requested by the one of the plurality of user-side devices.

8. The layer 2 link handler as described in claim 1, wherein said labeling means assigns the label by negotiating a label number with the plurality of user-side devices and the plurality of NSPs.

9. The layer 2 link handler as described in claim 1, wherein said labeling means assigns the label according to an operation of a network management operation device.

10. The layer 2 link handler as described in claim 1, wherein said path specification means further includes an extracting means that extracts a destination name from the layer 2 link information emitted from the one of the plurality of user-side devices at the time of the layer 2 link connection request, and a conversion table that converts said connection destination name to a connection address, and a path determining means that uses the connection address to cause a path to be connected between the network-side device and the one of the plurality of NSPs.

11. The layer 2 link handler as described in claim 1, wherein said path specification means is software control by a processor, and the path connection means is hardware controlled by a switching means.

* * * * *